United States Patent [19]

Nakashika

[11] Patent Number: 5,473,478
[45] Date of Patent: Dec. 5, 1995

[54] ROTARY HEAD TYPE MAGNETIC RECORDING/REPRODUCING APPARATUS FOR DESIGNATING VIDEO/AUDIO SIGNALS IN ACCORDANCE WITH A PREDETERMINED DISTRIBUTION PATTERN

[75] Inventor: Masahiro Nakashika, Yokohama, Japan

[73] Assignee: Kabushiki Kaisha Toshiba, Kawasaki, Japan

[21] Appl. No.: 124,507

[22] Filed: Sep. 21, 1993

Related U.S. Application Data

[63] Continuation-in-part of Ser. No. 792,914, Nov. 15, 1991, abandoned.

[30] Foreign Application Priority Data

Nov. 16, 1990 [JP] Japan ..................................... 2-310872

[51] Int. Cl.$^6$ ...................................................... G11B 5/02
[52] U.S. Cl. ......................... 360/19.1; 360/36.1; 360/64; 360/48; 360/22
[58] Field of Search .......................... 360/19.1, 18, 36.1, 360/36.2, 35.1, 22, 64, 48; 358/343

[56] References Cited

U.S. PATENT DOCUMENTS

| Re. 33,001 | 7/1989 | Baldwin | 360/19.1 |
| 4,680,647 | 7/1987 | Moriyama | 358/343 |
| 4,939,605 | 7/1990 | Heitmann et al. | 358/343 |

FOREIGN PATENT DOCUMENTS

| 62-266701 | 11/1987 | Japan . |
| 1288078 | 11/1989 | Japan . |
| 1307977 | 12/1989 | Japan . |

*Primary Examiner*—Andrew L. Sniezek
*Attorney, Agent, or Firm*—Oblon, Spivak, McClelland, Maier, & Neustadt

[57] ABSTRACT

A rotary head type magnetic recording/playback apparatus for recording a video signal and an audio signal on multiple helical tracks formed on a magnetic tape and reproducing the video signal and audio signal therefrom. The apparatus includes a recording section for treating the helical tracks as multiple track groups each including N helical tracks, recording only a video signal on (N-K) helical tracks in each track group used as video-only tracks, and recording a video signal and an audio signal in a mixed manner on K helical tracks used as video/audio mixed tracks, and a reproducing section for reproducing the video signal and audio signal from the helical tracks in each of the track groups.

11 Claims, 21 Drawing Sheets

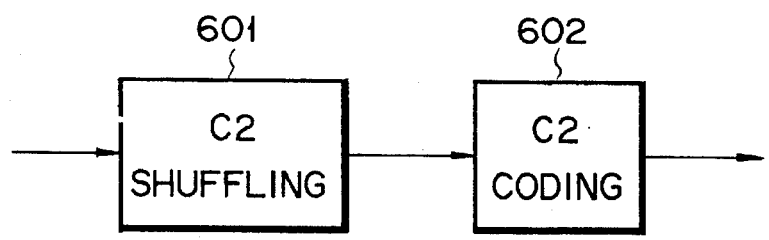
F I G. 7
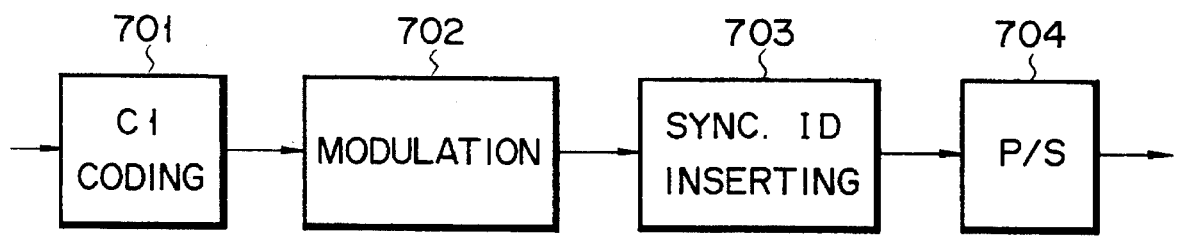
F I G. 8

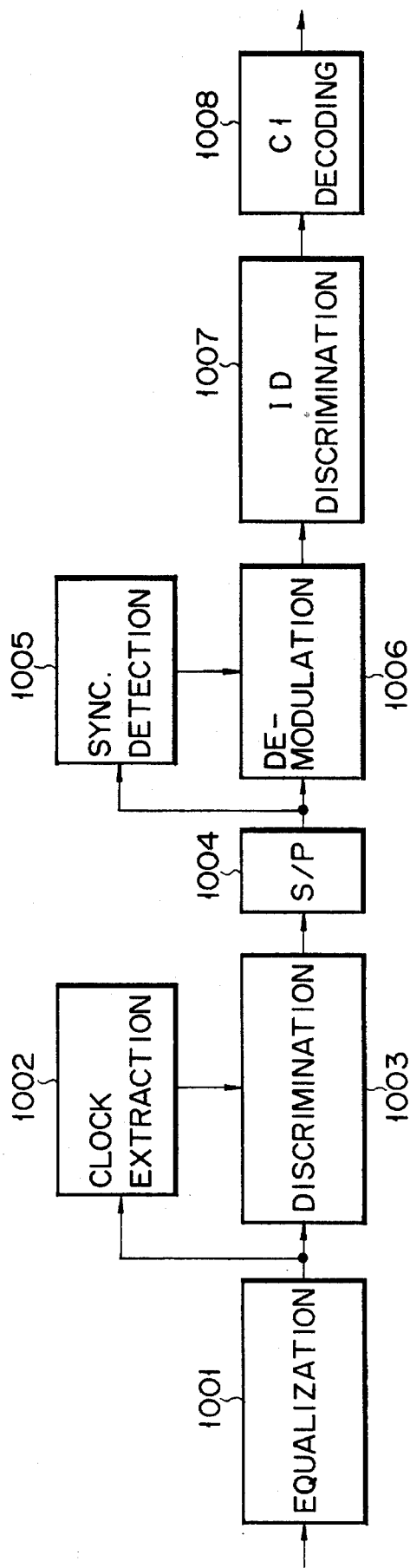
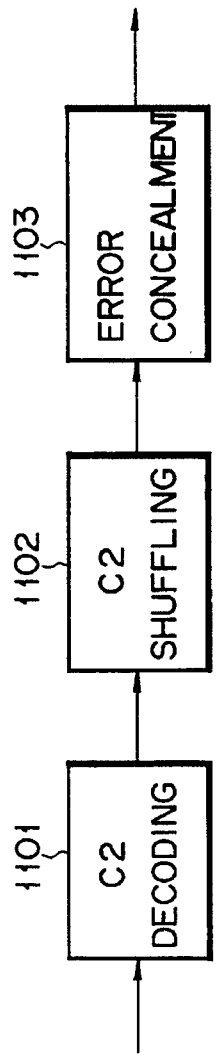
FIG. 11
FIG. 12

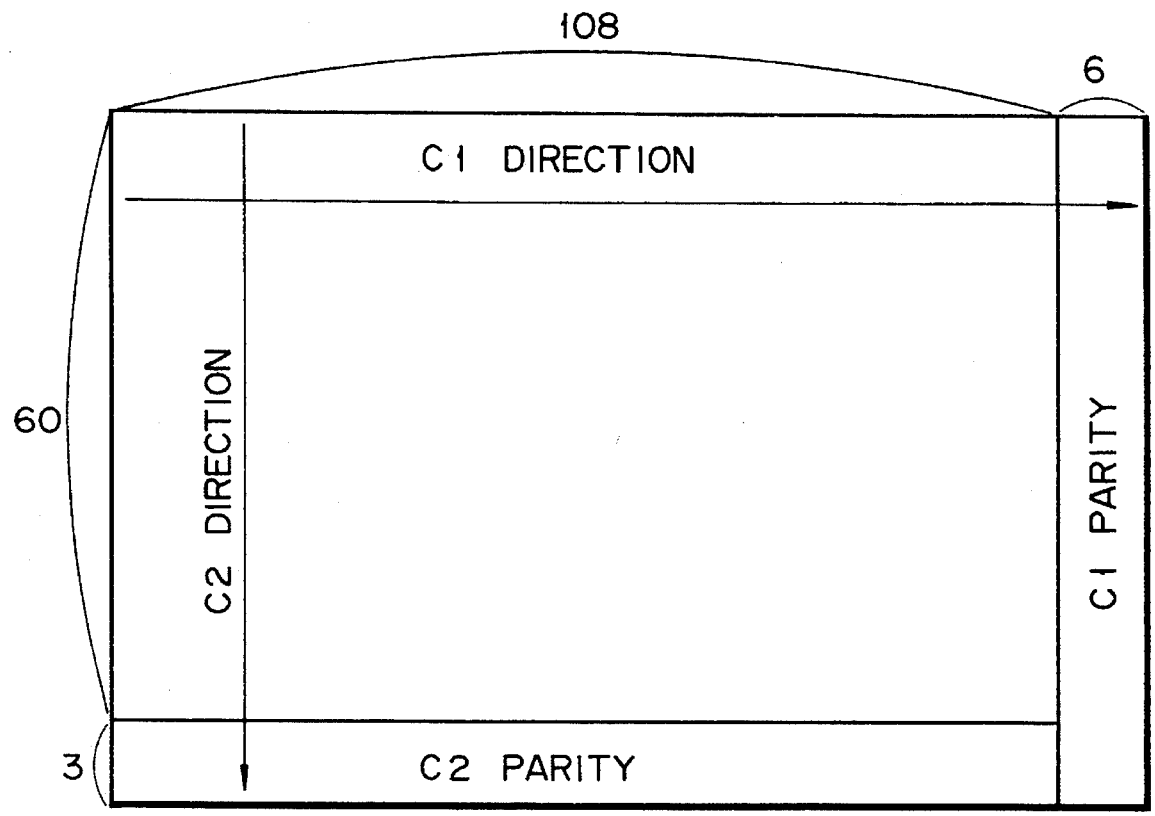
F I G. 15

FIG. 16

| N | K | A | B | P |
|---|---|---|---|---|
| 8 | 1 | 2 | 1 | 15 |

| 3 | 1 | 3 | 2 | 8 |
|---|---|---|---|---|

| 4 | 1 | 4 | 3 | 15 |
|---|---|---|---|---|

| 5 | 2 | 2 | 1 | 8 |
|---|---|---|---|---|

| 4 | 2 | 3 | 2 | 10 |
|---|---|---|---|---|

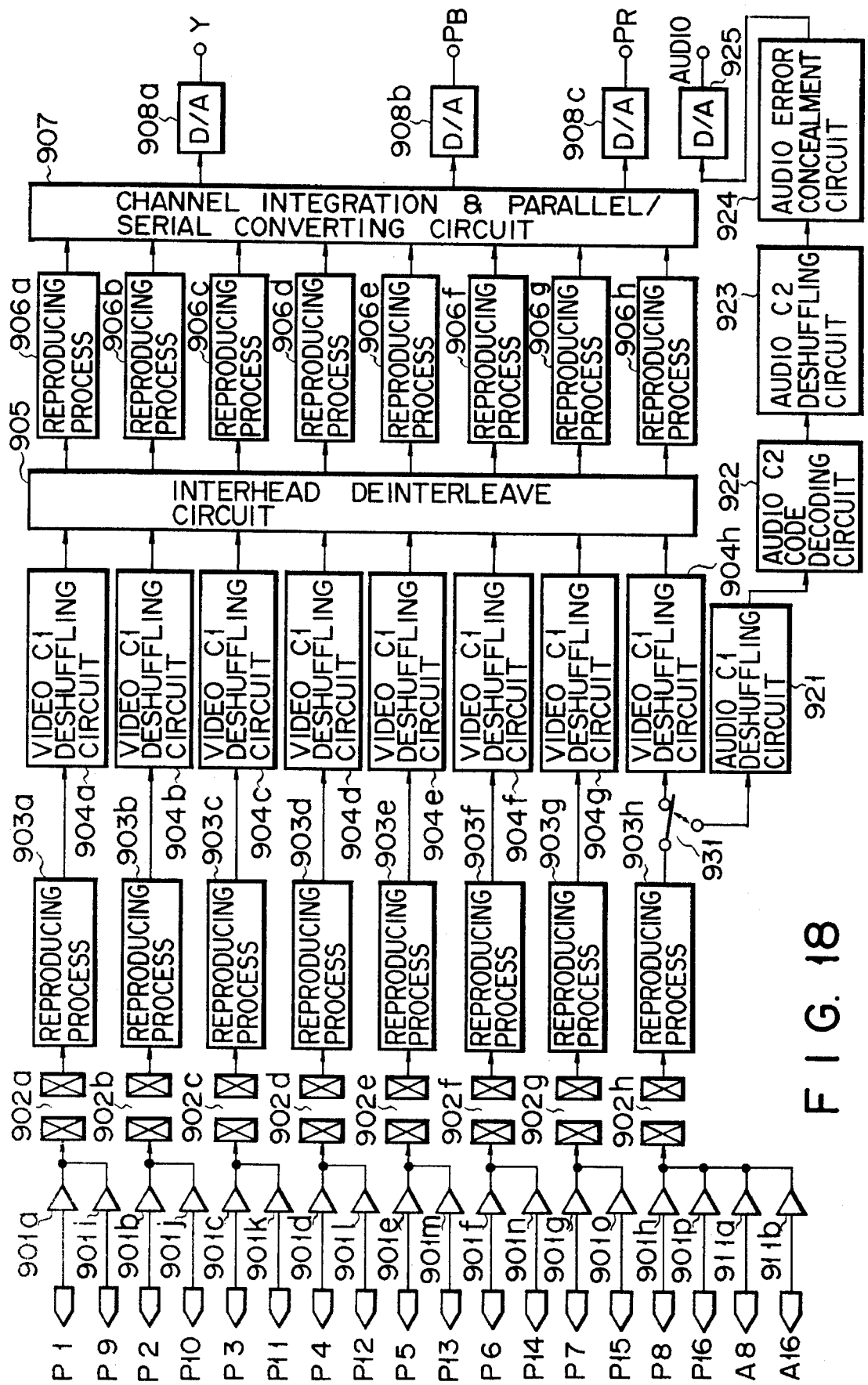

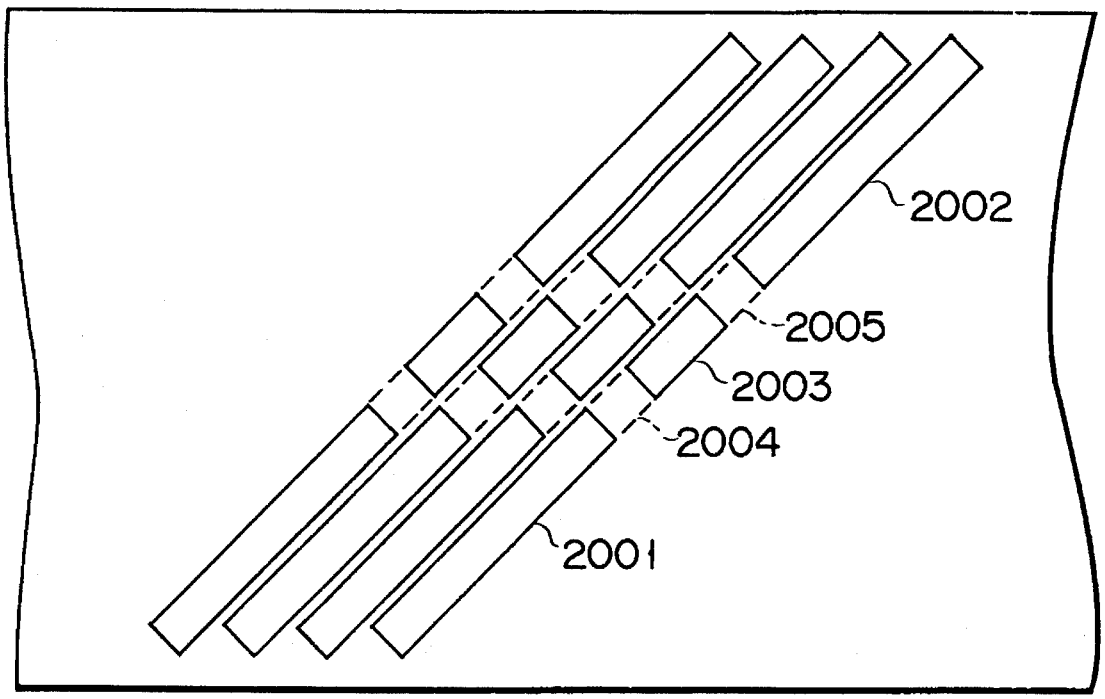
F I G. 22
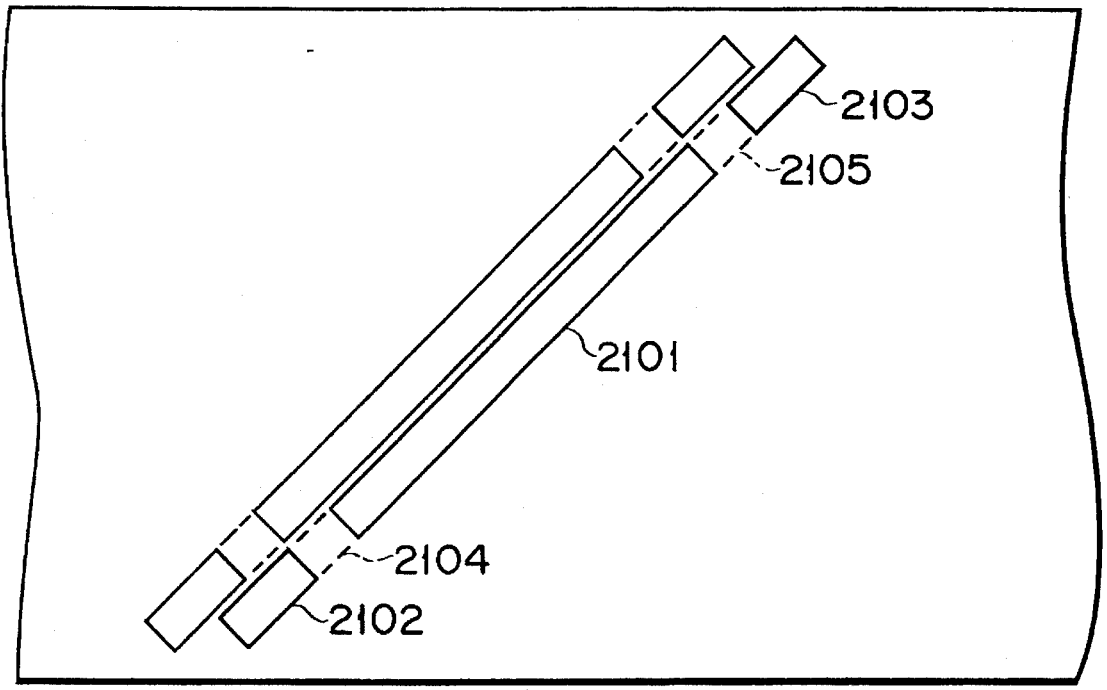
F I G. 23

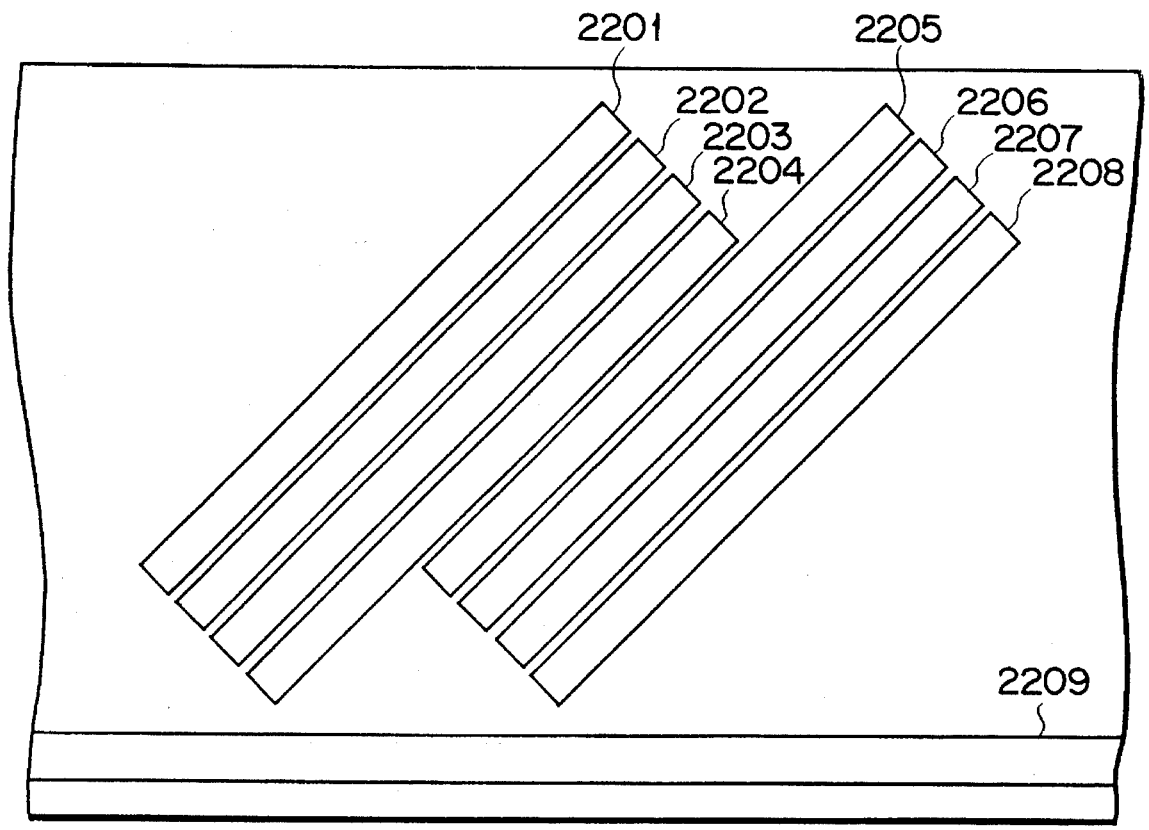
F I G. 24

```
Y SIGNAL      1473625147386251473625147386251 4
        → Y1   1    6    4    6    4    2    7    2
        → Y2   4    2    7    2    7    5    3    5
        → Y3   7    5    3    5    3    1    8    1
        → Y4   3    1    8    1    6    4    6    4

P_B SIGNAL    1 4 7 3 6 2 5 1 4 7 3 8 6 2 5 1
        → B1   1    7    6    5    4    3    6    5
        → B2   4    3    2    1    7    8    2    1

P_R SIGNAL    1 4 7 3 6 2 5 1 4 7 3 8 6 2 5 1
        → R1   1    7    6    5    4    3    6    5
        → R2   4    3    2    1    7    8    2    1
```

ROTARY HEAD TYPE MAGNETIC RECORDING/REPRODUCING APPARATUS FOR DESIGNATING VIDEO/AUDIO SIGNALS IN ACCORDANCE WITH A PREDETERMINED DISTRIBUTION PATTERN

This application is a Continuation-in-Part of application Ser. No. 07/792,914, filed on Nov. 15, 1991, now abandoned.

BACKGROUND OF THE INVENTION

1. Field of the Invention

The present invention relates to a rotary head type magnetic recording/playback apparatus which records signals while forming helical tracks on a magnetic tape with a rotary head. More particularly, this invention pertains to a digital VTR which records a digital video signal as well as a digital audio signal.

2. Description of the Related Art

Digital VTRs have an advantage that since they record or reproduce a video signal and an audio signal in the form of a digital signal, repetitive dubbing or editing will deteriorate neither the image quality nor the tone quality, thus ensuring high-quality signal recording and reproducing. These digital VTRs become popular first for industrial uses. There are two types of digital VTRs for industrial uses which have already been standardized and put into practical use: the D1 format VTR of component recording system and D2 format VTR of composite recording system.

FIG. 22 illustrates a track pattern on a magnetic tape in the D1 format digital VTR. Since it is difficult to record the whole amount of information of a digital video signal in one channel, the entire information is separated into four components which are then recorded in four channels in the D1 format of component recording type. As shown in FIG. 22 each helical track is divided into video recording regions 2001 and 2002 and an audio recording region 2003, with edit gaps 2004 and 2005 provided between these regions. In independently editing video and audio signals, the edit gaps 2004 and 2005 serve to enable or disable the erasing or recording while the associated head is scanning these areas.

FIG. 23 illustrates a track pattern on a magnetic tape in the D2 format digital VTR. In the D2 format of composite recording, the entire information of a digital video signal is separated into two components which are then recorded in two channels. Likewise, each helical track is divided into video recording region 2101 and audio recording regions 2102 and 2103, with edit gaps 2104 and 2105 provided therebetween, as shown in FIG. 23.

Though illustrated in neither FIG. 22 nor FIG. 23, each audio recording region is actually divided into smaller recording regions, with edit gaps also provided therebetween, so that independent editing is possible for individual audio channels. In FIGS. 22 and 23 three tracks formed along the tape, namely, a time code track, control track and cue audio track, are not shown.

In these conventional formats of digital VTRs, a digital audio signal is recorded on part of the helical track which also carries a video signal. This brings about an important advantage merit that the electromagnetic transformation section and some signal processors, which are associated with recording/playback of an audio signal, can be commonly used in recording/playback of a video signal. What can be shared include a mechanism, recording/playback head, recording/playback amplifier, modulation/demodulation circuit, waveform equalizing circuit, clock extracting circuit, synchronization pattern detecting circuit and part of an error correction coding/decoding circuit.

Most of the apparatuses associated with these formats are provided with the same number of audio advance playback heads as ordinary heads on the rotary drum. The advance playback heads are disposed at different heights with respect to the recording heads to reproduce signals of given times ahead in order to compensate for a time delay of an audio signal caused in the reproducing process and recording process. The audio data reproduced precedingly (read preceding or ahead) by the advance playback heads undergoes processing, such as mixing or filtering, and the processed audio data can be recorded again on the same (original) position on the tape.

A high definition television (HDTV) system which has over 1000 scan lines is receiving worldwide attention as a television system of the next generation. Although the detailed universal standards have not been established yet, development of this new television system is actively progressing in Japan. The HDTV has 1125 scan lines and uses a screen with a vertical-to-horizontal ratio of 9:16. The amount of information for the HDTV is more than five times that of the existing standard television system.

As a digital VTR for such an HDTV system having a huge amount of information, there exists a one-inch open reel type. This VTR is based on a one-inch type C VTR and divides a high definition signal into eight channels without compressing the information to record it digitally. An audio signal is digitally recorded on longitudinal tracks using a wide tape width. FIG. 24 shows a track pattern on a magnetic tape for one-inch open reel type high definition digital VTR; video recording regions 2201 to 2208 are helical tracks and an audio recording region 2209 is a longitudinal track (which actually consists of eight tracks). A time code track, control track and cue audio track, all formed along the tape, are not shown in FIG. 24.

Even for high definition digital VTRs, there is a growing demand for future appearance of a cassette type having better operability than the open reel type. It is therefore necessary to determine a new format for such a cassette type high definition digital VTRs. The format for the one-inch open reel type high definition VTRs cannot be used directly as the cassette type for the following reasons. Unlike in the open reel type, it is very difficult to increase the tape wrap angle close to 360° for the cassette type. In addition, for the cassette type it is practical to set the tape width to ¾ inch (about 19 mm) or narrower in order to reduce the mechanical load.

With regard to the system of recording an audio signal, with the use of a cassette with a 19-mm tape width, it becomes difficult to record multi-channel digital audio signals on longitudinal tracks due to the narrowed tape unlike in the one-inch high definition digital VTRs. In recording digital audio signals on longitudinal tracks, totally separate electromagnetic transformation sections and signal processors should be provided for video and audio signals while the aforementioned problems need to be addressed, and the adjustment and maintenance become more troublesome. Further, the edge portion of the tape where the longitudinal tracks are to be formed are easily damaged. In this respect, it is desirable to use a format to record an audio signal also on a helical track.

If digital audio signals are divided and recorded on the whole channels as performed in D1 and D2 formats, the following problems would arise.

(1) The amount of information of an audio signal per track becomes significantly smaller than that of a video signal, thus increasing the chance that audio data is impaired by a burst error.

(2) Since edit gaps should be provided on the entire tracks for information editing, the redundancy of data increases inevitably.

(3) The same number of advance playback heads for audio signals as the ordinary playback heads should be provided. In addition the increase in the number of the advance playback heads required results in an increase in the number of channels of the rotary transformer. For multi-channel recording VTRs of about eight channels, it is meaningless to further install the mentioned number of advance playback heads and rotary transformers only for editing of audio signals.

As described above, for the recording of audio signals on longitudinal tracks as performed in the conventional open reel type digital VTRs, totally separate electromagnetic transformation sections and signal processors are required for video and audio signals, and what is more, the adjustment and maintenance become more vexatious.

Since the technique of the conventional digital VTRs divides and records a digital audio signal on the entire channels, when it is applied to cassette type digital VTRs of a high definition television system, the amount of information of an audio signal per track is considerably reduced, causing audio data to be easily affected by a burst error. In addition, such application gives rise to increased redundancy due to the provision of edit gaps on the individual tracks, as well as a significant increase in the number of advance playback heads and the number of channels of the rotary transformer.

SUMMARY OF THE INVENTION

It is therefore an object of the present invention to provide a rotary head type magnetic recording/playback apparatus, which permits the circuitry for processing a video signal to be also used for processing of an audio signal, prevents audio data from being easily affected by a burst error, and minimizes the increase in the number of advance playback heads and the number of channels of the rotary transformer.

According to the present invention, a rotary head type magnetic recording/playback apparatus, which forms multiple helical tracks on a magnetic tape with a rotary head and records a digital video signal and a digital audio signal on the helical tracks, are designed in such a manner that (N-K) of N helical tracks are used exclusively for video tracks, with the remaining K helical tracks used exclusively for video/audio mixed tracks, video signals are recorded on the video-only tracks and the video/audio mixed tracks, error correction data is inserted in audio signals of a given period, and the error-correction data inserted audio signals are divisionally recorded on at least two video/audio mixed tracks.

More specifically, audio signals of a given period are added with error correction data of an equal or greater amount than that of the original data, these pieces of data are divided for two video/audio mixed tracks and separately recorded on two or more audio recording regions isolated by video recording regions on the video/audio mixed tracks.

According to this invention, the rotary head type magnetic recording/playback apparatus is also designed such that signals recorded on the video-only tracks and video/audio mixed tracks are reproduced by at least N playback heads, and at least K audio advance playback heads are so provided as to reproduce signals from audio recording regions on the video/audio mixed tracks preceding by given times to a predetermined video/audio mixed track while a predetermined playback head reproduces a signal from the audio recording region in that predetermined video/audio mixed track, whereby the signal reproduced by a predetermined playback head and the one reproduced by a predetermined audio advance playback head are switched from one to the other to be supplied to the rotary transformer.

That is, K audio advance playback heads are provided for N playback heads and are disposed in such a way that the period in which a predetermined playback head produces a signal from the audio recording region in a predetermined video/audio mixed track is matched with the period in which a predetermined audio advance playback head reproduces a signal from the audio recording region in that video/audio mixed track which precedes by a given time to the predetermined video/audio mixed track.

Switching means is provided in a rotary drum, and is controlled to supply the signal from the predetermined audio advance playback head to the rotary transformer instead of the signal from the predetermined playback head during the period of signal reproduction from the audio recording region in audio advance playback mode.

According to this invention it is desirable that the amount of data of an effective video signal per video-only track and the amount of data of an effective video signal per video/audio mixed track be set to a simple integer ratio of 2:1, for example.

According to this invention video signals are recorded on the video-only tracks and video/audio mixed tracks while audio signals are recorded on the video/audio mixed tracks, thereby permitting the electromagnetic transformation section and some signal processors for audio signals to be commonly used for video signals. Further, as audio data is concentrated on some tracks, the amount of information of an audio signal per audio recording region increases, making the audio data more resistant to a burst error, while it is possible to prevent the edit-gaps originated redundancy from increasing and the number of advance playback heads and the number of channels of the rotary transformer from increasing.

Furthermore, according to this invention, as error correction data is inserted in audio signals of a given period and the resultant audio signals are divisionally recorded on multiple video/audio mixed tracks, the audio signals will not become vulnerable to the clogging of heads although they are recorded at a high density on some tracks.

In addition, the arrangement of the audio advance playback heads in the above-described manner can eliminate the need for exclusive rotary transformers for the audio advance playback heads.

If the amount of data of an effective video signal per video-only track and the amount of data of an effective video signal per video/audio mixed track are set to a simple integer ratio, the rules of distributing video data to the individual tracks can be simplified.

In other words, there is provided a rotary head type magnetic recording/playback apparatus for recording a video signal and an audio signal on a plurality of inclined tracks formed on a magnetic tape with respect to a lengthwise direction thereof and for reproducing said video signal and said audio signal therefrom, comprising:

input means for receiving a video signal and an audio signal;

recording means for treating said inclined tracks as a plurality of track groups each including at least one first inclined track and a plurality of second inclined tracks, said recording means recording only a video signal on said second inclined tracks in each of said track groups, said second inclined tracks being used as video-only tracks, and recording a video signal and an audio signal in a mixed manner on said first inclined track used as a video/audio mixed track;

reproducing means for reproducing said video signal and said audio signal from said inclined tracks in each of said track groups; and means for distributing the video signal to the first and second tracks of each of the track groups, in accordance with a predetermined distribution pattern which is determined in accordance with an integer ratio of the amount of data of an effective video signal per video-only track to the amount of data of an effective video signal per video/audio mixed track, the integer ratio being A:B and determined such that the number S of recorded video samples per line is divisible by $P=A(N-K)+BK$, where K video/audio mixed tracks are provided per N tracks, the effective video signals being video signals actually recorded on said video-only track and said video/audio mixed track.

Further, there is a rotary head type magnetic recording/playback apparatus for recording a video signal including independently a luminance signal and color signals and an audio signal on a plurality of inclined tracks formed on a magnetic tape with respect to a lengthwise direction thereof and for reproducing said video signal and audio signal therefrom, comprising:

input means for receiving a video signal and an audio signal;

recording means for treating said inclined tracks as a plurality of track groups each including at least one first inclined track and a plurality of second inclined tracks, said recording means recording only a video signal on said second inclined tracks in each of said track groups, said second inclined tracks being used as video-only tracks, and recording a video signal and an audio signal in a mixed manner on said first inclined track used as a video/audio mixed track;

reproducing means for reproducing said video signal and said audio signal from said inclined tracks in each of said track groups; and means for distributing the luminance signal to the first and second tracks of each of the track groups, in accordance with a predetermined distribution pattern which is determined in accordance with a first integer ratio ($K_y$) of the amount of data of an effective luminance signal per video-only track to the amount of data of an effective luminance signal per video/audio mixed track, the integer ratio $K_y = A_y/B_y$ being determined such that the number $S_y$ of recorded luminance signal samples per line is divisible by $P_y=A_y(N-K)+B_yK$, where K video/audio mixed tracks are provided per N tracks, the effective luminance signals being luminance signals actually recorded on said video-only track and said video/audio mixed track and/or for distributing the color signals to the first and second tracks of each of the track groups, in accordance with a predetermined distribution pattern which is determined in accordance with a second integer ratio ($K_c$) of the amount of data of an effective color signal per video-only track to the amount of data of an effective color signal per video/audio mixed track, the integer ratio $K_c=A_c/B_c$ being determined such that the number $S_c$ of recorded color signal samples per line is divisible by $P_c=A_c(N-K)+B_cK$, where K video/audio mixed tracks are provided per N tracks, the effective color signals being color signals actually recorded on said video-only track and said video/audio mixed track.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 7 is a diagram showing the internal structure of a first record processing circuit in FIG. 6;

FIG. 8 is a diagram showing the internal structure of a second record processing circuit in FIG. 6;

FIG. 11 is a diagram showing the internal structure of a first reproducing circuit in FIG. 10;

FIG. 12 is a diagram showing the internal structure of a second reproducing circuit in FIG. 10;

FIG. 15 is a diagram illustrating the structure of a video error correction matrix in this embodiment;

FIG. 16 is a diagram showing a pattern of distribution of a luminance (Y) signal to tracks;

FIG. 18 is a schematic structural diagram of a reproducing signal processing circuit according to a second embodiment;

FIG. 22 is a diagram illustrating a track pattern for a conventional D1 format digital VTR;

FIG. 23 is a diagram illustrating a track pattern for a conventional D2 format digital VTR;

FIG. 24 is a diagram illustrating a track pattern for a conventional one-inch open reel type HDTV digital VTR;

DETAILED DESCRIPTION OF THE PREFERRED EMBODIMENTS

The first preferred embodiment of the present invention will now be described referring to the accompanying drawings. A high definition television system is directed to this embodiment, and a cassette type HDTV digital VTR will be described.

To begin with, video/audio data to be recorded will be explained. Since a sync video signal is not necessary to be recorded, the following valid data is actually to be recorded. There are 1080 effective lines per frame (540 lines per field), 1920 effective samples per line for a luminance signal (Y signal) and 960 effective samples for color signals ($P_B$ and $P_R$ signals). A field frequency is 60 Hz. An audio signal has a sampling frequency of 48 KHz. The PCM audio signal consisting of a maximum of 20 bits per sample is to be recorded in four channels. All of the data can be recorded without compressing the data.

Figure 1:
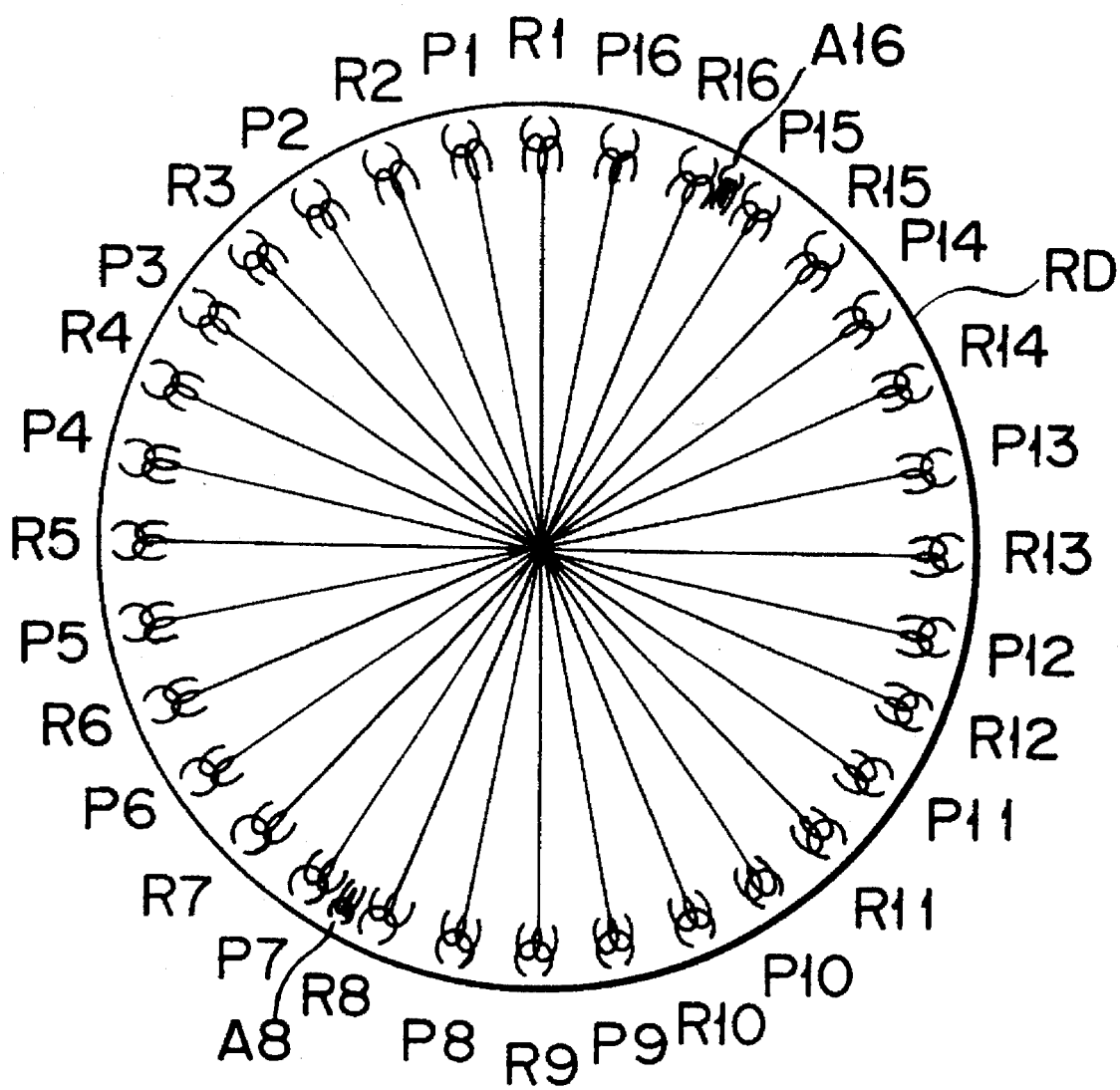
FIG. 1 is a schematic diagram illustrating a rotary drum on which recording heads and playback heads are installed.

This VTR has eight divided channels to reproduce recorded data as well as those of the aforementioned 1-inch open reel type HDTV digital VTR described above. The wrap angle of the cassette type VTR cannot be set as large as that of the open reel type VTR. During scanning by eight recording heads (and eight playback heads), therefore, the nonactive time of heads (time where data is neither recorded on the tape nor reproduced therefrom) becomes longer, reducing the actual data recording rate. Thus, the system for use is so designed that 16 recording heads and 16 playback heads are mounted on a rotary drum and the wrap angle is set to 180 degrees to switch the two facing heads alternatively as shown in FIG. 1. In other words, eight of the 16 recording (or reproducing) heads are constantly driven. If the rotary drum has a circuit which switches signals to two recording heads (and signals from two playback heads) at every 180 degrees, a rotary transformer can be used in a time-shared manner so as to reduce the number of channels of the rotary transformers to eight for information recording as well as for information reproduction. Signal processors for recording and reproduction should also be provided for only eight channels. Since the rotary drum rotates 150 times per second (2.5 revolutions per field), there are 40 tracks per field.

Figure 2:
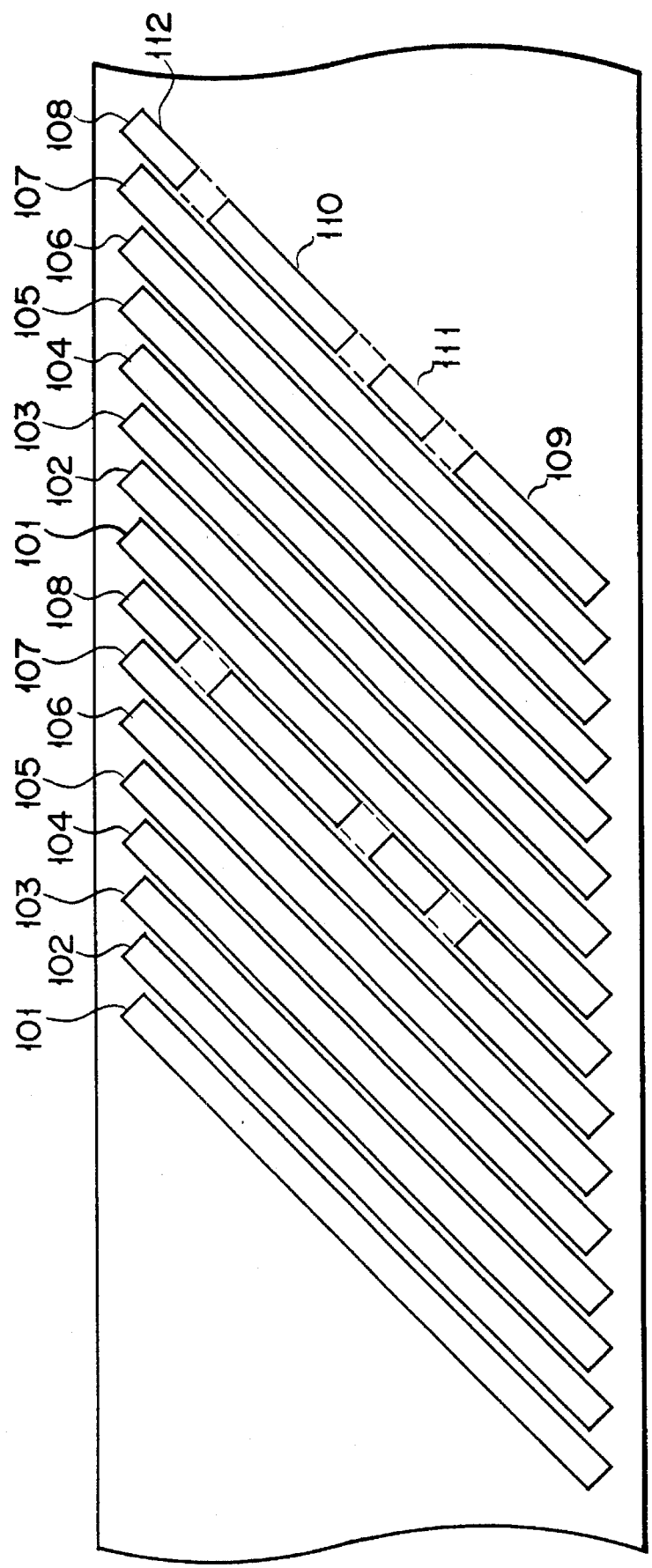
FIG. 2 is a diagram illustrating a track pattern according to a first embodiment of the present invention.

FIG. 2 shows a track pattern on a magnetic tape according to this embodiment. Among eight (= N) tracks, which are scanned by eight heads corresponding to half the rotation of the rotary drum, N-K (=7) tracks are used as video-only tracks 101 to 107, and the remaining K (=1) track is used as a video/audio mixed track 108. Video recording regions 109 and 110 and audio recording regions 111 and 112 are provided on the video/audio mixed track 108. A time code track, a control track and a cue audio track lying in the longitudinal direction of the tape do not directly relate to the subject matter of the present invention and are therefore omitted in the diagram.

The contents of the tracks 101 to 108 will now be explained. The video-only tracks 101 to 107 and the video/audio mixed track 108 have the same total number of symbols in a single track.

Figure 3:
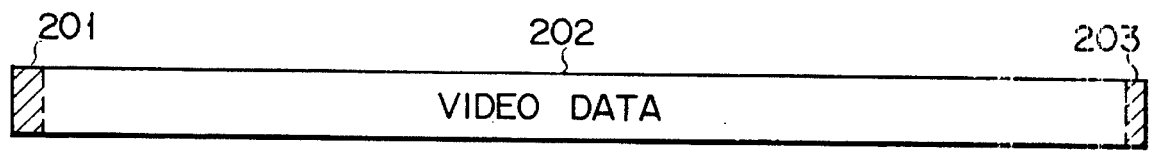
FIG. 3 is a diagram showing the contents of a video-only track in FIG. 2.

As shown in FIG. 3 each the video-only tracks 101 to 107 consists of only a video recording region which has a preamble 201, a video data portion 202 and a postamble 203. The preamble 201 serves to lock a PLL (phase-lock loop) in a clock extracting circuit, preceding the video data portion 202. The postamble 203 serves to reproduce data surely to the end of the video data portion 202. The preamble 201 and the postamble 203 protect the video data portion 202.

Figure 4:
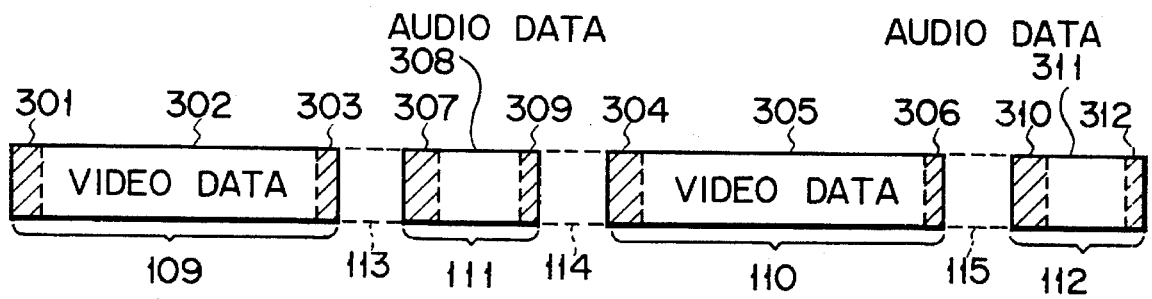
FIG. 4 is a diagram showing the contents of a video/audio mixed track in FIG. 2.

The video/audio mixed track 108 includes two video recording regions 109 and 110 and two audio recording regions 111 and 112, alternately arranged, as shown in FIG. 4. In the recording regions 109 to 112, preambles 301, 304, 307 and 310, postambles 303, 306, 309 and 312, video data portions 302 and 305 and audio data portions 308 and 311 are provided. These preambles and postambles as well as those previously described protect the data portions. Further, edit gaps 113 to 115 are provided between the recording regions 109 to 112 to permit the video and audio signals to be separately edited.

Figure 5:
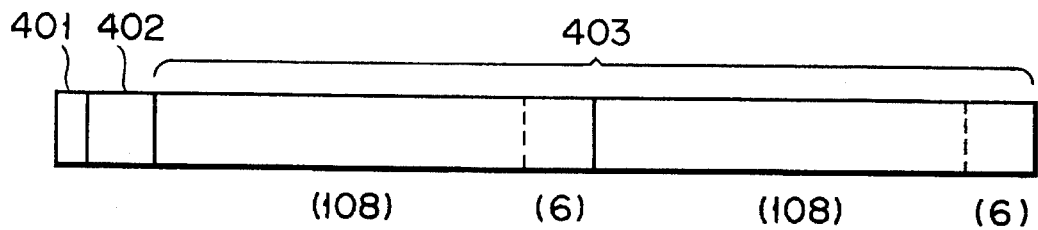
FIG. 5 is a diagram illustrating the structure of a sync block in FIGS. 3 and 4.

FIG. 5 illustrates the structure of a sync block as a recording unit for the individual tracks 101 to 108. The sync blocks of both video and audio recording regions have the same structure. The sync block consists of a sync pattern 401, an ID and its parity symbol 402, and data and its parity symbol 403. The section of the data and parity symbol (error correction code) 403 has two C1 code words to be described later (the data portion has 108 symbols and the parity portion has 6 symbols, amounting to a total of 114 symbols). The ID is an address to identify which sync block on which track that ID belongs.

The specific structure of the VTR having the above-described format according to this embodiment will be explained.

Figure 6:
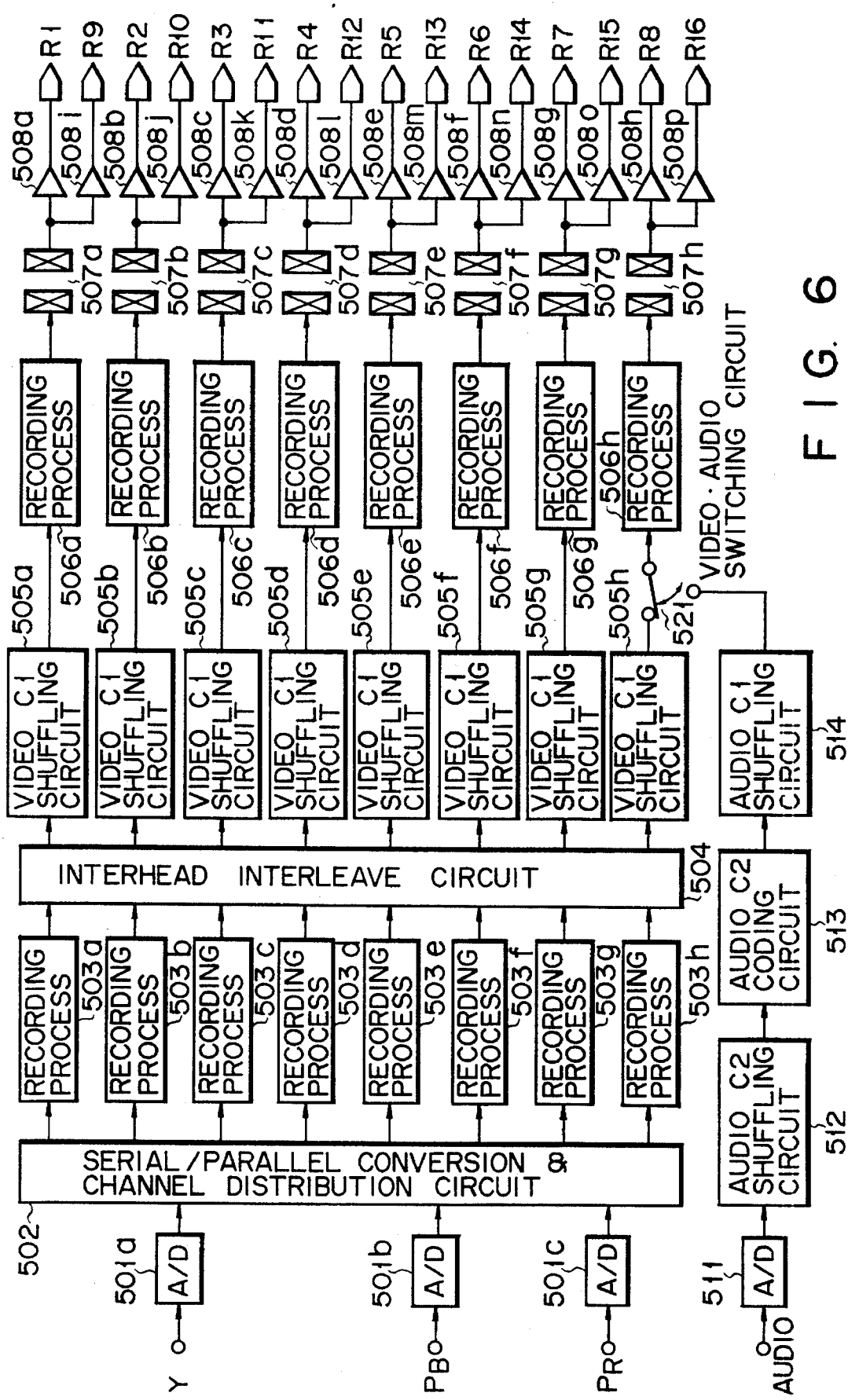
FIG. 6 is a schematic structural diagram of a recording signal processing circuit according to this embodiment.

FIG. 6 shows the schematic structure of a recording signal processing circuit in the embodiment. The recording signal processing circuit comprises video A/D converters 501a to 501c, a serial/parallel converting and channel distributing circuit 502, first record processing circuits 503a to 503h, an interhead interleave circuit 504, video C1 shuffling circuit 505a to 505h, an audio A/D converter 511, an audio C2 shuffling circuit 512, an audio C2 coding circuit 513, an audio C1 shuffling circuit 514, a video/audio switching circuit 521, second record processing circuits 506a to 506h, rotary transformers 507a to 507h, recording amplifiers 508a to 508p and recording heads R1 to R16.

As apparent from the internal structure shown in FIG. 7, the first record processing circuits 503a to 503h each have a video C2 shuffling circuit 601 and a video C2 coding circuit 602.

As apparent from the internal structure shown in FIG. 8, each of the second record processing circuits 506a to 506h includes a C1 code coding circuit 701, a modulator 702, a sync-pattern/ID inserting circuit 703 and a parallel/serial converter 704.

In FIG. 6, input analog video signals (Y, $P_B$ and $P_R$ signals) are converted into 8-bit digital signals by the video A/D converters 501a to 501c, respectively, and are divided into eight channels. The data rate of each channel drops through this process, requiring a lower processing clock accordingly. The use of a high speed element, such as an ECL, is not therefore required in the stages following the serial/parallel converting and channel distributing circuit 502. In the first record processing circuits 503a to 503h, data is rearranged in the individual video C2 shuffling circuits 601 with a relatively small memory capacity, and coding for video C2 error correction is performed in the video C2 coding circuits 602. Then, the interhead interleave circuit 504 redistributes the data to the tracks to improve the burst error correction function. The video C1 shuffling circuits 505a to 505h use relatively large memories to rearrange the data once more, and also serve as data buffers.

An input 4-channel analog audio signal is converted into a digital signal, having a 48-kHz sampling frequency and consisting of a maximum of 20 bits, by the audio A/D converter 511. The audio C2 shuffling circuit 512 rearranges the data of the digital signal, and the audio C2 coding circuit 513 performs coding for audio C2 error correction. The audio C1 shuffling circuit 514 rearranges the data once more, while serving as a data buffer.

The video/audio switching circuit 521 switches the video data signal from the 8th-channel C1 shuffling circuit 505h to the audio data signal from the C1 shuffling circuit 514 or vice versa at a predetermined timing, and multiplexes the signal. In each of the second record processing circuits 506a to 506h, the modulator 702 modulates data in accordance with the characteristics of the magnetic recording/reproducing system, the sync-pattern/ID inserting circuit 703 inserts a sync-pattern/ID and the preamble/postamble into the data, and the parallel/serial converter 704 converts the received data into serial data. The 8-channel serial data are transferred via the rotary transformers 507a to 507h to the rotary drum, are amplified by the recording amplifiers 508a to 508p, and are then recorded on the magnetic tape by the recording heads R1 to R16. The recording heads R1 to R16 are provided on the rotary drum at the equal intervals in the named order. The heads R1 to R8 face the heads R9 to R16 at 180 degrees, respectively. One of recording amplifier pairs, 508a and 508i, 508b and 508j, . . . , and 508h and 508p, is set to be active according to the phase of the rotary drum.

Figure 9:
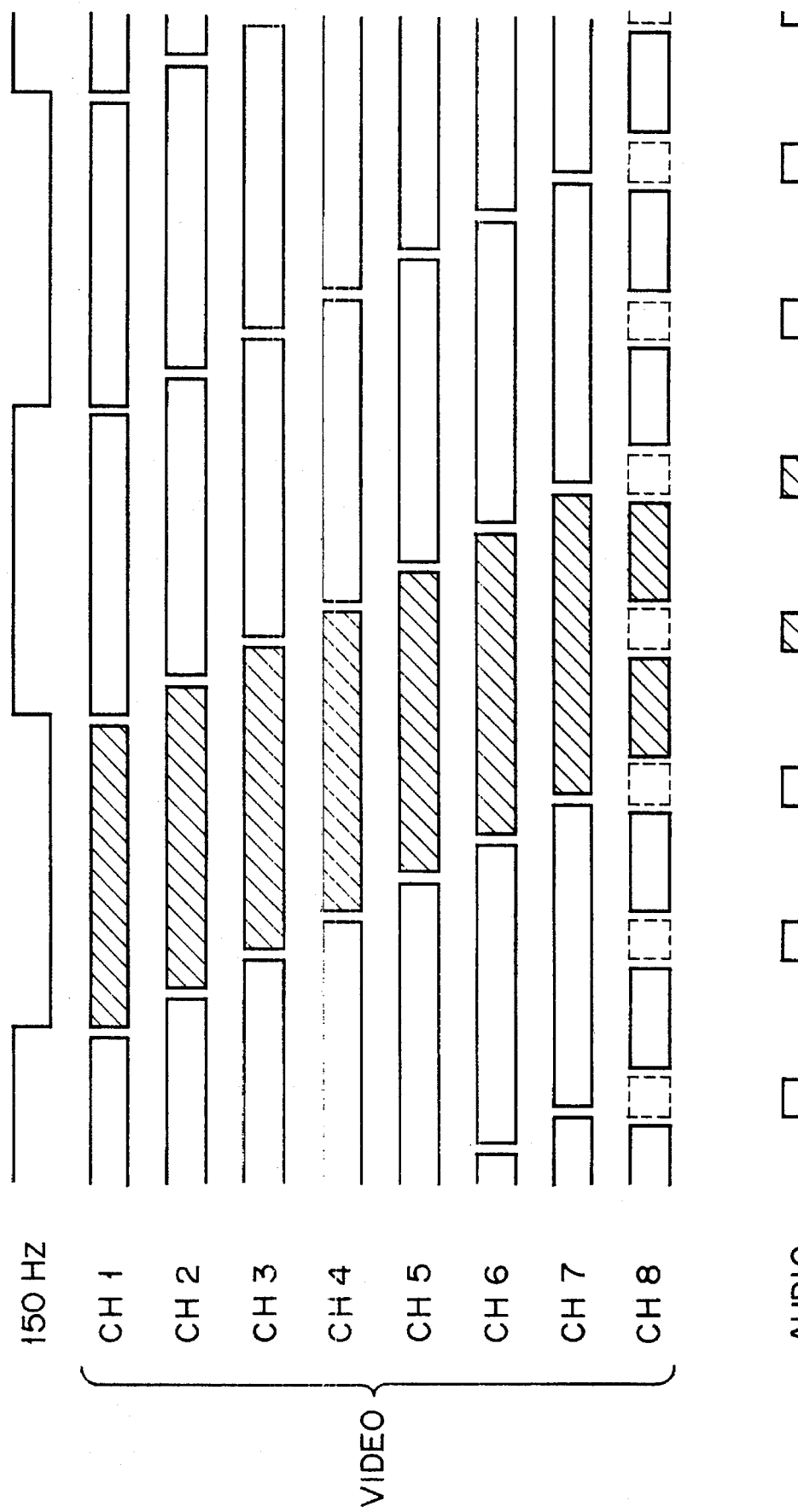
FIG. 9 presents a timing chart in recording mode in this embodiment.

FIG. 9 is a timing chart for the recording mode. The shaded portions indicate data to be supplied to the eight recording heads (e.g. R1 to R8) which are equivalent to a half of the rotation of the rotary drum. video data of channels 1 to 8 is to be read from the video C1 shuffling circuits 505a to 505h at the timing as indicated in FIG. 9. Audio data is also to be read from the audio C1 shuffling circuit 514 at the indicated timing. In the channel 8, those pieces of data are switched by the video/audio switching circuit 521 to be multiplexed. In this manner, the audio data can be recorded on only two parts of one helical track (video/audio mixed track 108) out of eight.

Figure 10:
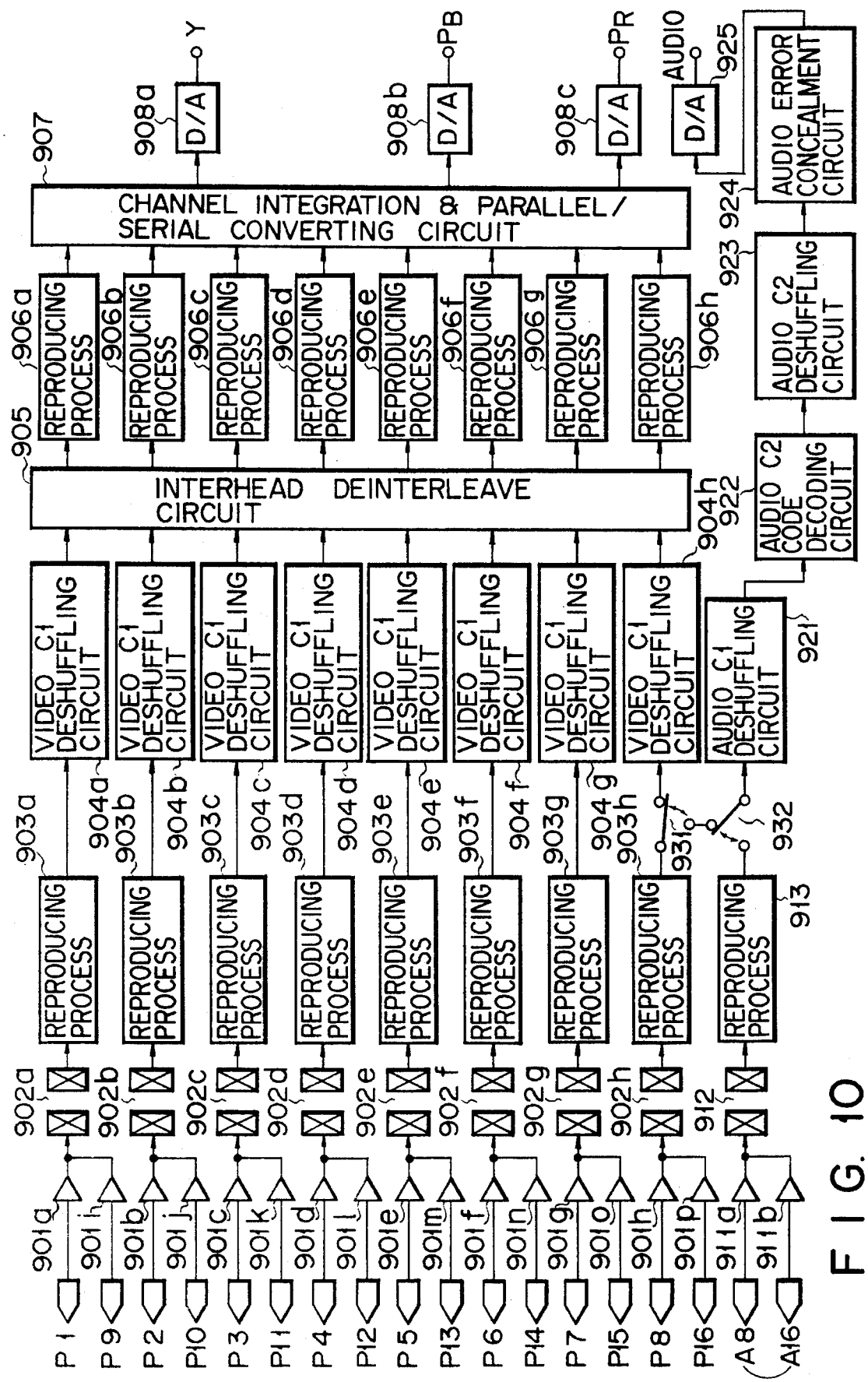
FIG. 10 is a schematic structural diagram of a reproducing signal processing circuit according to this embodiment.

FIG. 10 schematically illustrates the structure of a reproducing signal processing circuit according to this embodiment. This reproducing signal processing circuit comprises playback heads P1 to P16, audio advance playback heads A8 and A16, reproducing amplifiers 901a to 901p, 911a and 911b, rotary transformers 902a to 902h and 912, first reproducing circuits 903a to 903h and 913, a video audio switching circuit 931, video C1 deshuffling circuits 904a to 904h, an interhead deinterleave circuit 905, video second reproducing circuits 906a to 906h, a video channel integration and parallel/serial converting circuit 907, video D/A converters 908a to 908c, an audio switching circuit 932, an audio C1 deshuffling circuit 921, an audio C2 code decoding circuit 922, an audio C2 deshuffling circuit 923, an audio error concealment circuit 924 and an audio D/A converter 925.

The first reproducing circuits 903a to 903h and 913 serve to perform processes associated with the second record processing circuits in FIG. 6. As apparent from the internal structural diagram in FIG. 11, each first reproducing circuit includes a wave equalization circuit 1001, a clock extracting circuit 1002, a data discriminator 1003, a serial/parallel converter 1004, a synchronization pattern detecting circuit 1005, a demodulator 1006, an ID discriminator 1007 and a C1 code decoding circuit 1008.

The second reproducing circuits 906a to 906h serve to perform processes associated with the first record processing circuits in FIG. 6 and their internal structures are given in FIG. 12. As apparent from FIG. 12 each second reproducing circuit includes a video C2 code decoding circuit 1101, a video C2 deshuffling circuit 1102 and a video error concealment circuit 1103.

Referring to FIG. 10 signals reproduced from the magnetic tape by the playback heads P1 to P16 are amplified by reproducing amplifiers 901a to 901p, respectively, and are extracted from the rotary drum via rotary transformers 902a to 902h. The playback heads P1 to P16 are mounted at equal intervals on the rotary drum in the named order, in such a way that the heads P1 and P9 face each other at an angle of 180 degrees, the heads P2 and P10 face each other at an angle of 180 degrees, and so forth. One of the individual pairs of reproducing amplifiers 901a and 901i, 901b and 901j, . . . , and 901h and 901p is rendered active in accordance with the phase of the rotary drum, permitting the signals from the two playback heads apart 180 degrees from each other to be multiplexed in the rotary drum.

An 8-channel reproducing signal is subjected to wave-equalization in the wave equalization circuit 1001 in each of the reproducing circuits 903a to 903h, and a data clock is extracted from the resultant signal by the clock extracting circuit 1002. The data discriminator 1003 discriminates whether a data bit is "0" or "1" and the output of the data discriminator 1003 is converted into 8-bit parallel data in the serial/parallel converter 1004. Further, the synchronization pattern detecting circuit 1005 detects and protects a sync pattern, the demodulator 1006 performs a demodulation which is the opposite process to the modulation, and the ID discriminator 1007 discriminates and protects the ID of a sync block, and the C1 code decoding circuit 1008 decodes the C1 error correction code. In the channel 8 the video audio switching circuit 931 switches between video data and audio data at a given timing; this timing is the same as the one shown in FIG. 9.

The video C1 deshuffling circuits 904a to 904h each using a relatively large memory serve as data buffers as well as perform the opposite processing of the video C1 shuffling circuits 505a to 505h. The interhead deinterleave circuit 905 performs the opposite processing of the interhead interleave circuit 504. In the reproducing circuits 906a to 906h, the video C2 code decoding circuit 1101 decodes a video C2 error correction code, and the video C2 deshuffling circuit 1102 using a relatively small memory performs the opposite processing of the video C2 shuffling circuit 601. The video error concealment circuit 1103 performs interpolation of error-uncorrectable data in accordance with data in the proximity thereof on the screen. The video channel integration and parallel/serial converting circuit 907 integrates channels. The outputs of this circuit 907 are converted into analog video signals (Y, $P_B$ and $P_R$) by the video D/A converters 908a to 908c, respectively.

The audio data separated by the video audio switching circuit 931 is supplied to the audio switching circuit 932 to be described later. The output of the switching circuit 932 is supplied to the audio C1 deshuffling circuit 921. The deshuffling circuit 921 serves as a data buffer and performs the opposite processing of the audio C1 shuffling circuit 514, and the audio C2 code decoding circuit 922 decodes an audio C2 error correction code. The audio C2 deshuffling circuit 923 performs the opposite processing of the audio C2 shuffling circuit 512. The audio error concealment circuit 924 performs interpolation of error-uncorrectable data with data around this data. The output of the audio error concealment circuit 924 is converted into a four-channel analog audio signal by audio D/A converter 925.

The signals reproduced from the magnetic tape by the audio advance playback heads A8 and A16 are amplified by reproducing amplifiers 911a and 911b, and are extracted from the rotary drum via the rotary transformer 912. The audio advance playback heads A8 and A16 are separated 180 degrees from each other, facing each other, so as to scan video/audio mixed tracks of given preceding times.

Either the reproducing amplifier 911a or 911b is enabled in accordance with the phase of the rotary drum, so that the signals from the audio advance playback heads A8 and A16 are multiplexed in the rotary drum. Either the advance playback audio signal having undergone the same processing of the reproducing circuits 903a to 903h in the reproducing circuit 913 or the reproducing audio signal from the playback head P8 or P16 is selected by the audio switching circuit 932. The switching circuit 932 selects the advance playback signal only when the above-discussed editing of audio data is performed.

In FIGS. 5 and 9 the digital input/output circuitry and the circuitry for variable-speed reproduction (such as shuttle reproduction and slow reproduction) for video and audio signals, and the like, installed in an actual apparatus, are omitted.

As given in the foregoing description referring to FIGS. 1 to 12, K tracks among N tracks serve as video/audio mixed tracks, and only part of the playback heads or recording heads are used to scan the video/audio mixed tracks. More specifically, in the first embodiment an audio recording region is provided as the video/audio mixed track on only one (= K) track per eight (= N) tracks. This video/audio mixed track is scanned by only two of the sixteen playback heads, while the remaining fourteen playback heads scan no audio tracks, but only the video-only tracks. That is, this embodiment simply needs two audio advance playback heads and one channel of a rotary transformer for preceding reproduction, whereas the conventional apparatus which divides and records audio data onto the whole tracks, requires sixteen audio advance playback heads and eight rotary transformers for preceding reproduction. Further, in the case where audio data is divisionally recorded on the whole tracks, a minimum of eight audio recording regions and a minimum of eight edit gaps are necessary per eight tracks. According to this embodiment, however, two audio recording regions are needed per eight tracks, which means a greater amount of data per audio recording region, thus facilitating stable information reproduction. In addition, this embodiment requires only three edit gaps per eight tracks, suppressing an increase in redundancy.

The following will discuss more specifically how a video signal and audio signal are processed in this embodiment. The following description will be given primarily for the purpose of easily explaining the contents of the processing, and should not necessarily correspond to the actual processing order in the circuits as shown in FIGS. 6 and 10.

To begin with, the processing of an audio signal will be described.

In this embodiment, a 4-channel digital audio signal is recorded and reproduced, and the processing of the audio signal will be completed for each unit of $2/5$ field. This unit corresponds to a two-segment period of a video signal (to be described later). In this period there are 320 (=4800÷60×$2/5$) audio samples per channel. These samples are separated every other sample into a group of even-numbered samples and a group of odd-numbered samples, with 160 samples serving as a unit for error correction. As there are 20 bits (maximum) per sample, the total bits for 160 samples are equivalent to 400 symbols (one symbol=8 bits). One error correction matrix is constituted with audio data of 400 symbols as a unit.

Figure 13:
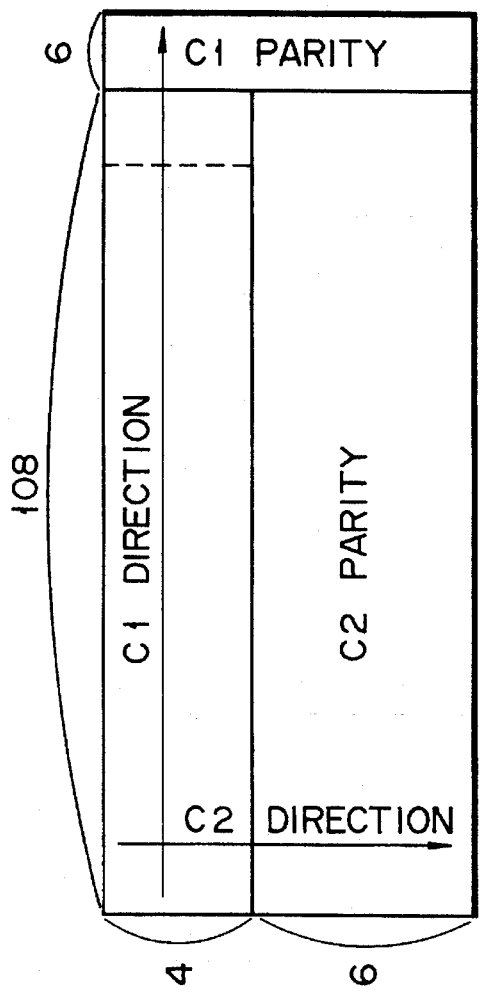
FIG. 13 is a diagram illustrating the structure of an audio error correction matrix in this embodiment.

FIG. 13 shows the structure of the audio error correction matrix. First, auxiliary data of 32 symbols is added to data of 400 symbols to provide data of 432 symbols in total. These symbols are arranged in 4 rows and 108 columns. At the same time C2 shuffling and C1 shuffling are executed in two stages, thus enhancing the effect of error concealment when error correction is not possible. More specifically, C2 parity data of six symbols is initially added vertically to 4-symbol data, and then C1 parity data of six symbols is added horizontally to 108-symbol data or C2 parity data. The structure of a C1 code is the same as a video signal, and the C1 code coding circuit is shared by the C1 code and video signal. This two-directional coding enhances error correcting performance both to a random error and a burst error.

Ten C1 code words in the error correction matrix in FIG. 13 formed in the above manner are separated into two groups (group 1 and group 2) each of five words. The above processing is performed for each of four channels, and five C1 code words assigned to each channel are collected for four channels, forming a data group consisting of twenty C1 code words. As a result, there are four data groups formed: groups 1 and 2 for even-numbered samples and groups 1 and 2 for odd-numbered samples. These data groups will be called "E1," "E2," "O1" and "O2" in order. As shown in FIG. 5, since one sync block includes two C1 code words, each data group consists of ten sync blocks.

Figure 14:
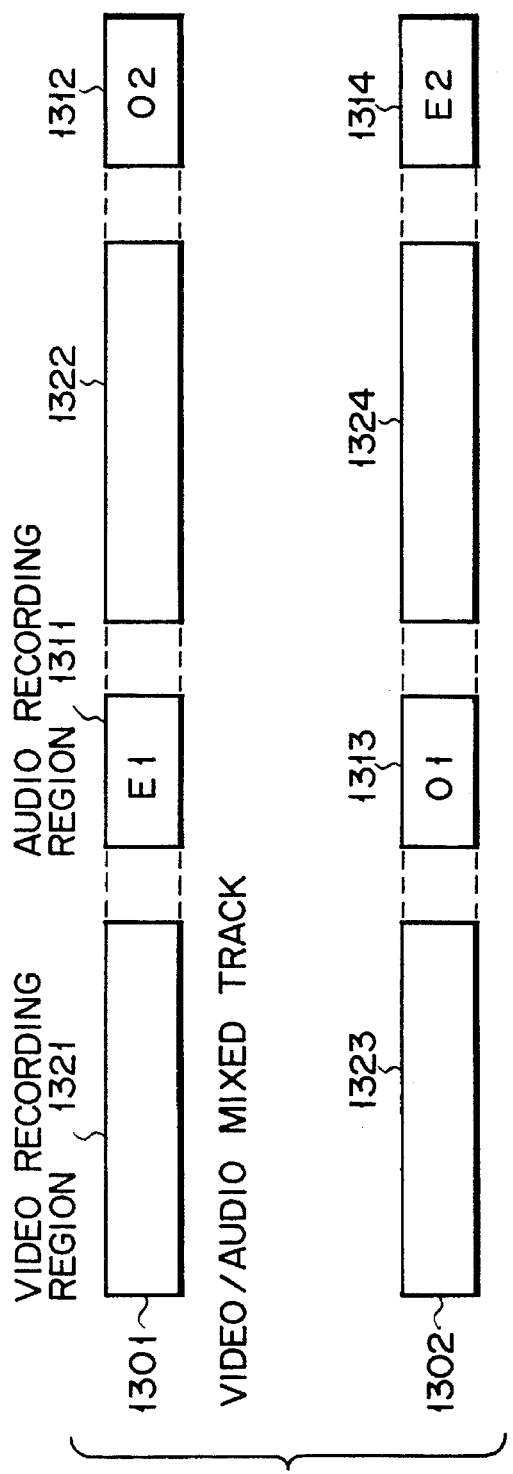
FIG. 14 is a diagram illustrating the distribution of audio data to individual recording regions.

Those data groups are divisionally recorded on four separate regions on a tape as shown in FIG. 14. Two video/audio mixed tracks 1301 and 1302 are scanned with two different heads, respectively. Between the video/audio mixed tracks 1301 and 1302 lie seven video-only tracks (not shown). Regions 1321 to 1324 are video recording regions, and audio recording regions 1311 to 1314 respectively correspond to E1, 02, 01 and E2. The timing for supplying audio data to the video audio switching circuit 521 is controlled in such a way as to record E1 and 02, and 01 and E2 onto the two video/audio mixed tracks as described above. Two audio recording regions are formed at the center and rear portions of each of the two video/audio mixed tracks, with a video recording region in between.

For a C2 error correction code, 6-symbol error correction data is added to the 4-symbol original data. Therefore, by detecting an error with the C1 error correction code and erasure correction is carried out with the C2 error correction code, an error of the C2 error correction code word up to six symbols can completely be corrected (in the case of using a Reed-Solomon code, for example). In general, if C2 error correction symbols equal to or greater in quantity (the number of symbols) than original data are added to the original data, an error up to at least half the C2 error correction code word can be corrected by erasure correction using the C1 code or the like for error detection. According to this embodiment, ten symbols of an arbitrary C2 error correction code word are divided five each into data groups E1 and E2 (01 and 02). That is, an error-correction coded audio signal is divisionally recorded on two or more video/audio mixed tracks which are scanned by two or more different heads. Even when one of the two heads that scan the video/audio mixed tracks cannot reproduce data at all due to clogging or the like, therefore, either the data group E1 or E2 and either the data group 01 or 02 are reproducible, thus ensuring complete error correction. In addition, if two audio recording regions along the lengthwise direction of the tape are not simultaneously reproducible, since either the data group E1 or E2 and either the data group 01 or 02 are also reproducible, complete error correction becomes possible. In other words, the number of heads involved in reproducing (or recording) an audio signal is greater than two.

Further, even if any three of four audio recording regions shown in FIG. 14 are not reproducible, since either the even-numbered samples or odd-numbered samples are completely correctable, good error concealment better than the averaged interpolation is possible. Generally, high density recording of audio data on some tracks makes audio data susceptible to the clogging of heads; however, according to this embodiment, data is distributed over and recorded on a total of four regions on two tracks to prevent audio data from becoming vulnerable to the clogging of the heads or a burst error. It is generally said that, of a helical track, the center portion is where the data error ratio is the lowest, the data error ratio becoming higher for the rear track portion and the front track portion in the named order. The arrangement of the tracks as employed in this embodiment is therefore effective in order to suppress the chance of data being simultaneously in error while reducing the error ratio of audio data.

A description will now be given of the processing of a video signal. When one out of eight tracks is used as a video/audio mixed track, and the remaining seven tracks as video-only tracks as in this embodiment, the recording format for a video signal may become very complex. However, this embodiment employs the following measure to prevent the recording format of a video signal from becoming overly complicated.

First, a video signal for a 1-field screen (540 lines) is divided into five segments each of 108 lines. One segment corresponds to eight tracks (seven video-only tracks and one video/audio mixed track), and processing the video signal will be completed in one segment. Video data of one segment is distributed over 64 error correction matrixes in total. The structure of one video error correction matrix is illustrated in FIG. 15. Each error correction matrix has effective video data arranged in 60 vertical symbols and 108 horizontal symbols. At this time two-stage shuffling (C2 and C1) is performed while distributing data between the individual error correction matrixes, thus enhancing the effect of concealment for an error when error correction is not possible. The C2 code words are arranged vertically, and a 3-symbol C2 parity symbol is added to these C2 code words; C1 code words are arranged horizontally with a 6-symbol C1 parity symbol is added to these C1 code words. The two directional coding in this manner can achieve the enhanced error correcting performance to a random error as well as a burst error.

Thereafter, interhead interleaving is performed in order to further enhance the burst-error correcting performance. More specifically, a total of 63 lines of each error correction matrix are distributed, eight lines from the top (every eight C1 error correction code words), into track 1, track 2, . . . , and track 8. To the last track 8, however, seven lines are distributed. The last three lines distributed to the track 8 is C1 error correction code words concerning the C2 parity data. In other words, eight lines are distributed for each of the tracks 1 to 7, and C1 error correction code words concerning 4-line effective video data are distributed to the track 8. Therefore, the amount of data of the effective video signal on the track 8, a video/audio mixed track, is just a half of that of the effective video signal on the track 1 (or any of the tracks 2 to 7), a video-only track. On each track, the C1 error correction code words on the same lines of the entire error correction matrixes, i.e., 64 C1 error correction code words, are consecutively arranged. As one sync block includes two C1 error correction code words, data of one line of the entire error correction matrixes includes 32 sync blocks. Consequently, each C2 code word is to be interleaved with 32 sync blocks. That is, 256 (=32×8 lines) sync blocks will be recorded on the track 1 (or any of the tracks 2 to 7). Video data equivalent to 224 (=32×7 lines) sync blocks on the track 8, which is a video/audio mixed track, are divided into two each of 112 sync blocks and the divided groups are respectively recorded on the two video recording regions 109 and 110 in FIG. 4.

The following will describe the correlation between video data on the screen and individual tracks.

Figure 16:
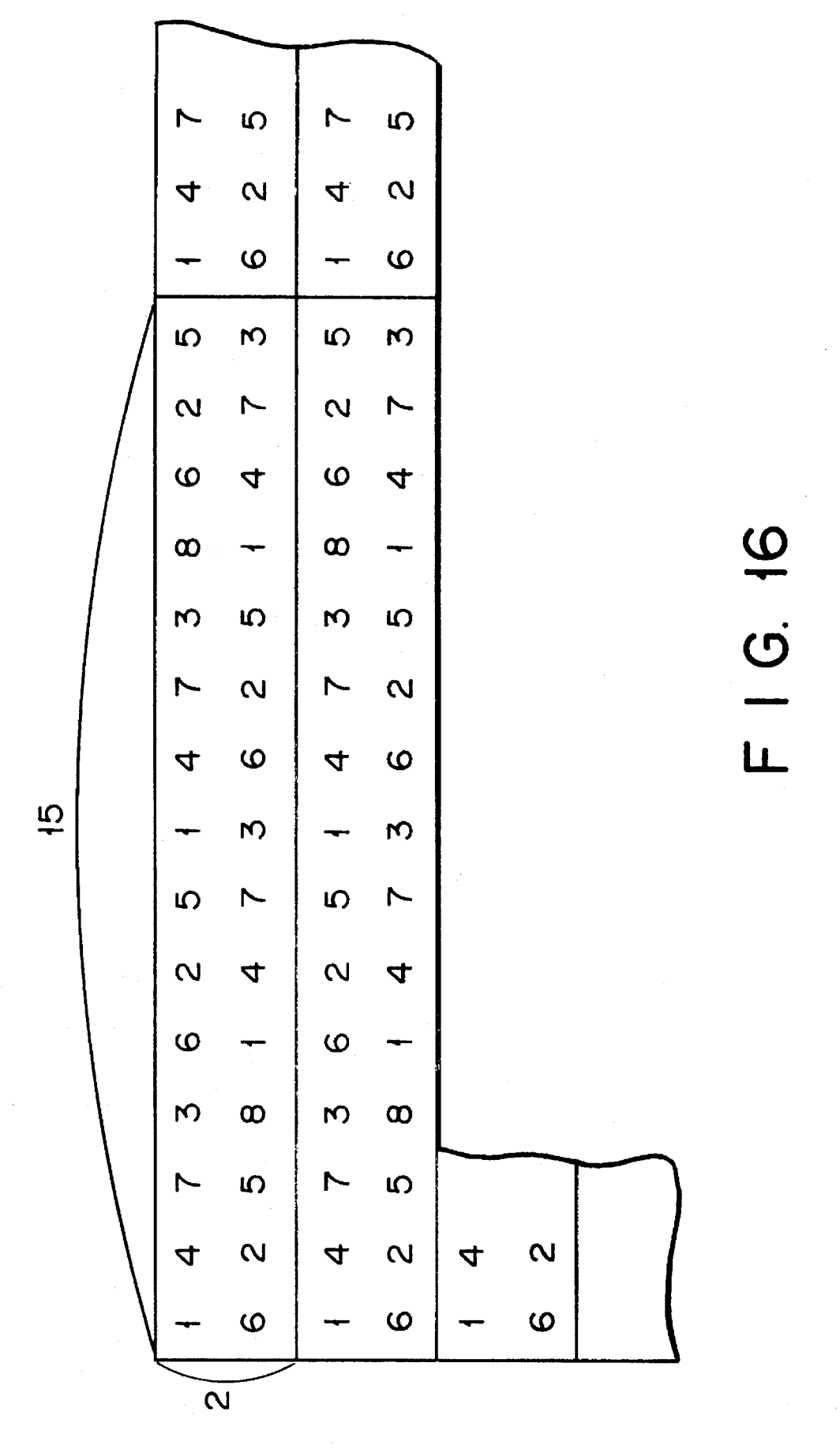

Individual pixel data will be finally distributed to any of the tracks after going through any of the error correction matrixes. In consideration of the clogging of the heads or burst error, it is desirable that those pieces of data on the same track be located as far apart from one another as possible on the screen. FIG. 16 illustrates a distribution pattern of a Y signal to the individual tracks, numerals "1" to "8" denoting the track numbers. This distribution pattern has the following features. First, the pattern allows pieces of data not only on the same track but also on adjoining tracks to be located as far apart from one another as possible. Secondly, 15 horizontal samples×2 lines are a unit block of the distribution pattern. In the unit block the tracks 1 to 7 appear four times while the track 8 appears only twice. As the distribution pattern has a cycle of 15 horizontal samples, there will be no residual for one video line (1920 samples for the Y signal) because the effective number of samples, 1920, is divisible by "15." The $P_B$ and $P_R$ signals are also distributed in a similar pattern. That is, the amount of effective video data on the track 8 becomes just a half of that on any of the other tracks, as has been described earlier.

As described above, by permitting the amount of data of an effective video signal on a video-only track and the amount of data of an effective video signal on a video/audio mixed track to have a relation of a simple integer ratio (2 to 1 in this embodiment), the video/audio mixed track becomes different from the other tracks (video-only tracks), but the recording format is not complicated. Without such an integer ratio relation, it is significantly difficult to give simple rules (see FIG. 16) to the distribution pattern of pixels to the individual tracks.

The above will be discussed more generally. In a case where K video/audio mixed tracks are to be provided per N tracks, given the ratio of the amount of data of an effective video signal per video-only track to that of an effective video signal per video/audio mixed track is A:B, the recording format (particularly, rules of distributing pixels to the tracks) becomes simple by making P=A(N-K)+BK divisible by the number of effective samples S. In the above example, N=8, K=1, A=2 and B=1, S=1920 is divisible by P=2×(8−1)+1×1=15.

With N=8 and K=1, all the possible combinations of A and B which permits S to be divisible by P=A(N-K)+BK would be as listed in Table 1 below.

TABLE 1

With N = 8, K = 1 and S = 960

| A | B | P |
|---|---|---|
| 2 | 1 | 15 |
| 4 | 2 | 30 |
| 8 | 4 | 60 |
| 9 | 1 | 64 |
| 11 | 3 | 80 |
| 13 | 5 | 96 |
| 16 | 8 | 120 |
| 17 | 1 | 120 |
| 21 | 13 | 160 |
| 22 | 6 | 160 |
| 25 | 17 | 192 |
| 26 | 10 | 192 |
| 27 | 3 | 192 |
| 31 | 23 | 240 |
| 32 | 16 | 240 |
| 33 | 9 | 240 |
| 34 | 2 | 240 |
| 41 | 33 | 320 |
| 42 | 26 | 320 |
| 43 | 19 | 320 |
| 44 | 12 | 320 |
| 45 | 5 | 320 |
| 61 | 53 | 480 |
| 62 | 46 | 480 |
| 63 | 39 | 480 |
| 64 | 32 | 480 |
| 65 | 25 | 480 |
| 66 | 18 | 480 |
| 67 | 11 | 480 |
| 68 | 4 | 480 |
| 121 | 113 | 960 |
| 122 | 106 | 960 |
| 123 | 99 | 960 |
| 124 | 92 | 960 |
| 125 | 85 | 960 |
| 126 | 78 | 960 |
| 127 | 71 | 960 |
| 128 | 64 | 960 |
| 129 | 57 | 960 |
| 130 | 50 | 960 |
| 131 | 43 | 960 |
| 132 | 36 | 960 |
| 133 | 29 | 960 |
| 134 | 22 | 960 |

TABLE 1-continued

With N = 8, K = 1 and S = 960

| A | B | P |
|---|---|---|
| 135 | 15 | 960 |
| 136 | 8 | 960 |
| 137 | 1 | 960 |

In the above table the number of effective samples S per line for the color signal ($P_B$ or $P_R$ signal) is set to 960. If the combinations of A and B are set as given in Table 1, the distribution pattern of pixels to the individual tracks would be completed within a single line.

Likewise, let us consider the case where the present invention is applied to the D2 format. In this case, with N=2, K=1 and S=768, all the possible combinations of A and B which permits S to be divisible by P=A(N-K)+BK would be as listed in Table 2 below.

TABLE 2

With N = 2, K = 1 and S = 768 (A ≦ 20)

| A | B | P |
|---|---|---|
| 2 | 1 | 3 |
| 3 | 1 | 4 |
| 4 | 2 | 6 |
| 5 | 1 | 6 |
| 5 | 3 | 8 |
| 6 | 2 | 8 |
| 7 | 1 | 8 |
| 7 | 5 | 12 |
| 8 | 4 | 12 |
| 9 | 3 | 12 |
| 9 | 7 | 16 |
| 10 | 2 | 12 |
| 10 | 6 | 16 |
| 11 | 1 | 12 |
| 11 | 5 | 16 |
| 12 | 4 | 16 |
| 13 | 3 | 16 |
| 13 | 11 | 24 |
| 14 | 2 | 16 |
| 14 | 10 | 24 |
| 15 | 1 | 16 |
| 15 | 9 | 24 |
| 16 | 8 | 24 |
| 17 | 7 | 24 |
| 17 | 15 | 32 |
| 18 | 6 | 24 |
| 18 | 14 | 32 |
| 19 | 5 | 24 |
| 19 | 13 | 32 |
| 20 | 4 | 24 |
| 20 | 12 | 32 |

Likewise, let us consider the case where the present invention is applied to the D1 format. In this case, with N=4, K=1 and S=360 (for the color signal), all the possible combinations of A and B which permits S to be divisible by P=A(N-K)+BK would be as listed in Table 3 below.

TABLE 3

With N = 4, K = 1 and S = 360 (A ≦ 20)

| A | B | P |
|---|---|---|
| 3 | 1 | 10 |
| 3 | 1 | 10 |
| 4 | 3 | 15 |
| 5 | 3 | 18 |

TABLE 3-continued

With N = 4, K = 1 and S = 360 (A ≦ 20)

| A | B | P |
|---|---|---|
| 6 | 2 | 20 |
| 7 | 3 | 24 |
| 8 | 6 | 30 |
| 9 | 3 | 30 |
| 10 | 6 | 36 |
| 11 | 3 | 36 |
| 11 | 7 | 40 |
| 12 | 4 | 40 |
| 12 | 9 | 45 |
| 13 | 1 | 40 |
| 13 | 6 | 45 |
| 14 | 3 | 45 |
| 16 | 12 | 60 |
| 17 | 9 | 60 |
| 18 | 6 | 60 |
| 19 | 3 | 60 |
| 19 | 15 | 72 |
| 20 | 12 | 72 |

Figure 17A:
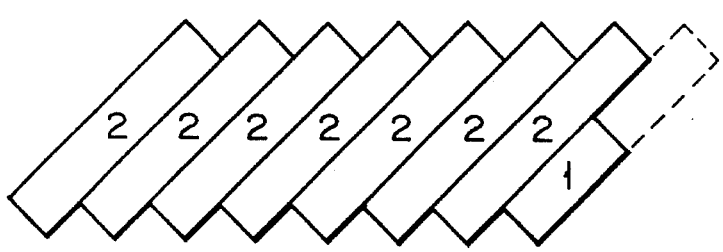
FIGS. 17A to 17E are diagrams illustrating various combinations of video-only tracks and video/audio mixed tracks.
Figure 17B:
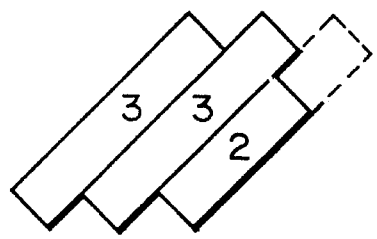
Figure 17C:
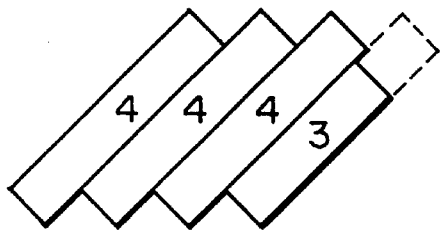
Figure 17D:
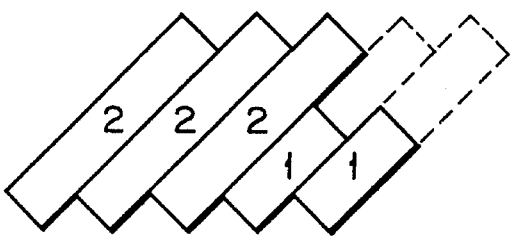
Figure 17E:
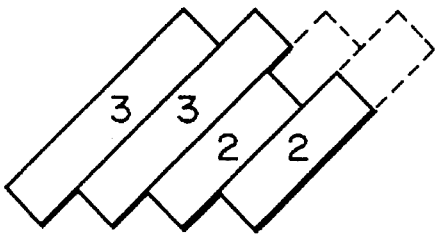

FIGS. 17A to 17E further illustrate combinations of N, K, A and B. More specifically, FIG. 17A shows an example with N=8, K=1, A=2 and B=1, FIG. 17B an example with N=3, K=1, A=3 and B=2, FIG. 17C an example with N=4, K=1, A=4 and B=3, FIG. 17D an example with N=5, K=2, A=2 and B=1, and FIG. 17E an example with N=4, K=2, A=3 and B=2.

The above embodiment will now be described in detail with reference to FIG. 25.

Figure 25:
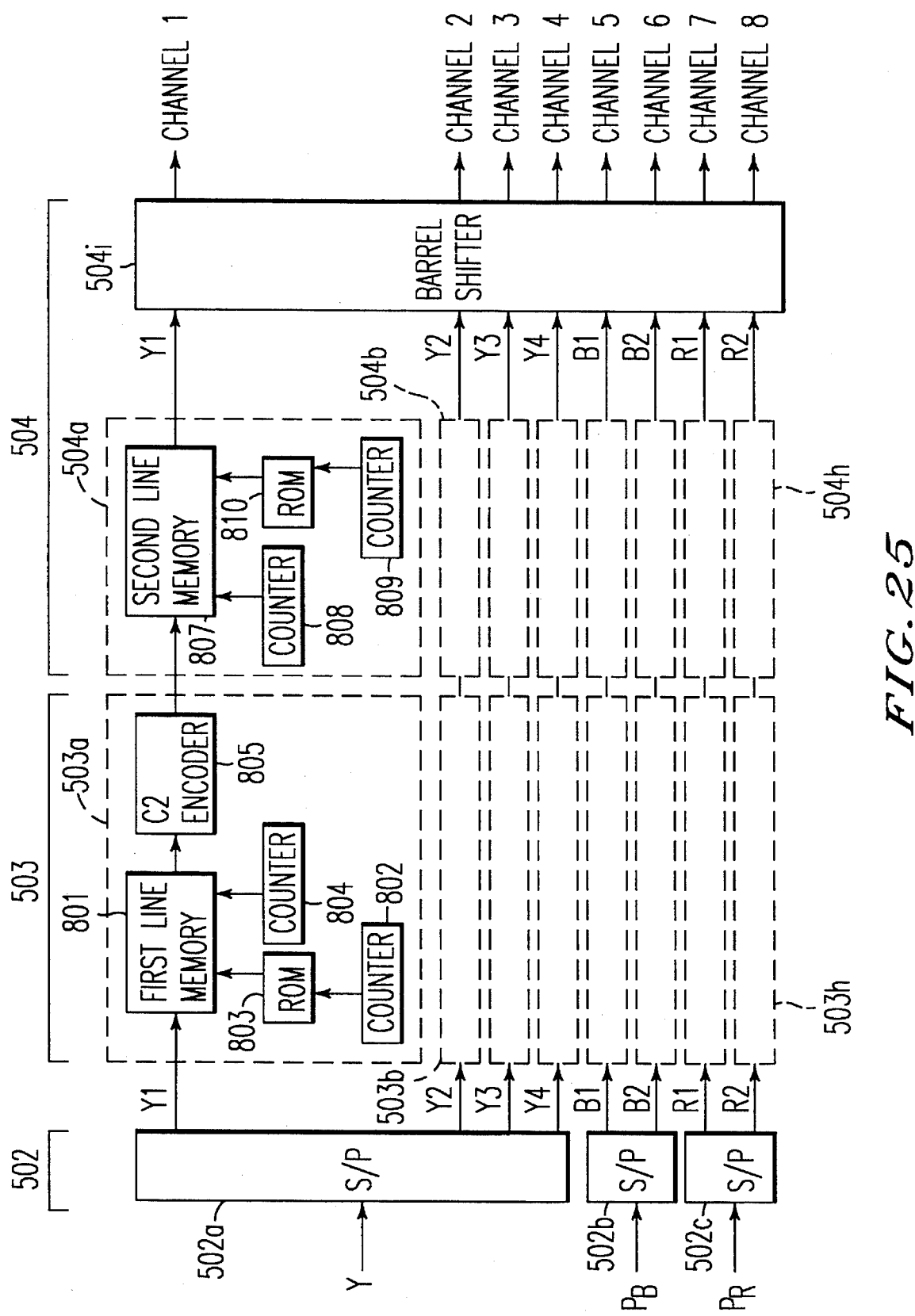
FIG. 25 is a detailed block circuit diagram showing a serial/parallel conversion-channel division circuit 502 of the recording signal processing circuit shown in FIG. 6, recording processing circuits 503a to 503h, and an interhead interleave circuit 504.

FIG. 25 shows a serial/parallel conversion-channel division circuit 502 of the recording signal processing circuit shown in FIG. 6, recording processing circuits 503a to 503h, and an interhead interleave circuit 504. More specifically, the serial/parallel conversion-channel division circuit 502 serves to convert a luminance signal Y in a serial/parallel manner, and divide the signal into four C2 channels, namely, luminance signals Y1, Y2, Y3 and Y4. Also, the division circuit serves to convert two types of color signals, for example, a blue signal $P_B$ and a red signal $P_R$, each in the serial/parallel manner, and divide the signals into four C2 channels, namely, color signals $B_1$, $B_2$, $R_1$, and $R_2$. It should be noted here that each of the C2 channels indicates a divided group among the serial/parallel conversion circuits (S/P circuits) 502a, 502b, and 502c, and the barrel shifter 504i, and differs from a recording/reproducing channel.

The recording processing circuits 503a to 503h, and the interhead interleave circuit 504, for processing parallel signals output from the S/P circuits 502a to 502c. Each of the recording processing circuits 503a to 503h includes a line memory 801 for storing a corresponding luminance signal or color signal from either one of the S/P circuits 502a to 502c, a counter 802 for counting samples of the luminance signal in order, a ROM 803, an address of which designated by an output from the counter 802, for sending an address of writing (write address) to the line memory 801, a counter 804 for counting the samples in order, and sending an address of reading (read address) to the line memory 801, and a C2 encoder 805 for encoding data read out from the line memory 801.

Figures 26, 27, 29:
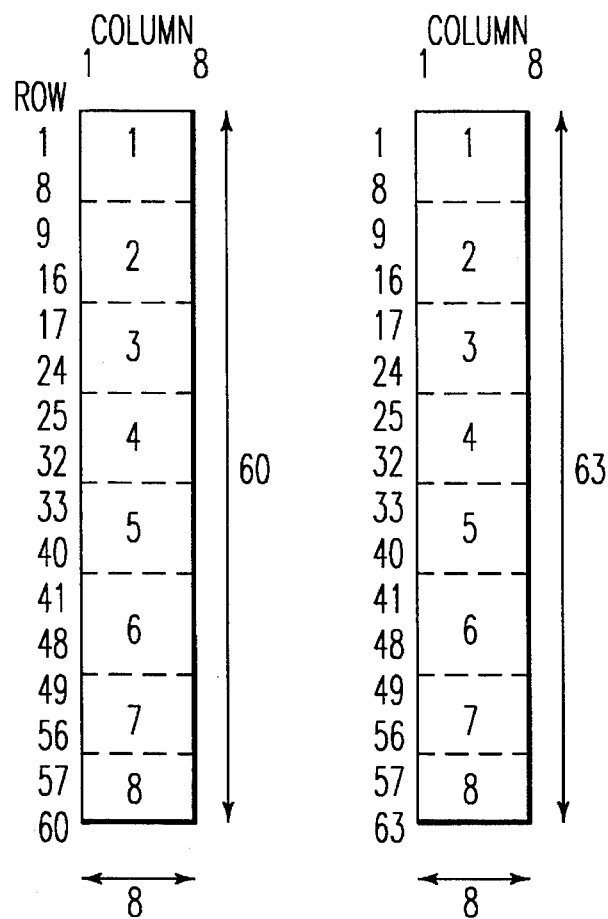
FIG. 26 is a distribution pattern in accordance with which data is distributed to recording tracks after serial/parallel conversion.
FIG. 27 is a diagram showing a structure of the first line memory shown in FIG. 25.
FIG. 29 is a diagram showing a structure of the second line memory shown in FIG. 25.

ROM 803 serves to store a distribution pattern used for distributing pixels such as those shown in FIG. 26 to the tracks, and send the write address to the line memory 801 in accordance with the distribution pattern by the count output of the counter 802. For determining the distribution pattern, the number P of samples which is divisible for the significant number S of samples per line can be obtained from the above-mentioned equation, P=A(N-K)+BK. In accordance with the obtained number P of samples, the sample corresponding to that sample number, namely, a certain distribution pattern for distributing pixels to a given number of tracks, is determined. The distribution pattern thus obtained is stored in the ROM 803 as address data for designating the write address of the line memory 801. Consequently, the address designation is thus performed for ROM 803 by the count output from the counter 802, and address data corresponding to the order, for example, shown in FIG. 26, that is, 1, 6, 4, 6, 4, 2, 7, 2, ..., as for Y1, is sent to the line memory 801.

The interhead interleave circuit 504 includes the processing circuits 504a to 504h, and the barrel shifter 504i. Each of the processing circuits 504a to 504h includes a line memory 807 for storing encoding data output from the C2 encoder 805, a counter 808 for counting samples of the luminance signal, and sending the write address to the line memory 807, and a counter 809 for counting samples of the luminance signal, and a ROM 810, the address of which is designated by the count output of the counter 809, and a ROM 810 for sending the write address to the line memory 807. The ROM 810 stores a pattern suitable for allowing data pass through the barrel shifter.

The operation of the recording signal processing circuit having the above-described structure will be described.

When a luminance signal Y and color signals $P_B$ and $P_R$ are input to the serial/parallel conversion circuits 502a, 502b, and 502c, the luminance signal Y is divided into four C2 channels, namely, $Y_1$, to $Y_4$, and similarly, the color signals $P_B$ and $P_R$ are divided into four C2 channels, namely, $B_1$, $B_2$, $R_1$, and $R_2$. In the serial state, a luminance signal has 1920 samples per line, and a color signal has 960 samples per line. Therefore, after the serial/parallel conversion, 480 samples are allocated to each of the C2 channels per line.

Eventually, the luminance signal and the color signal are distributed to channels as the pattern shown in FIG. 16, and therefore one line is distributed to channels in accordance with the distribution pattern such as shown in FIG. 26 after the serial/parallel conversion. In this case, the break-down of the 480 samples of each C2 channel is as follows. That is, 64 samples are stored in each of channels 1 to channel 7, and 32 samples are stored in channel 8. As shown in FIG. 17A, samples are distributed to C2 channels at a ratio of 2 to 1 as for each of the channels 1 to 7, and the channel 8.

The operation of writing data to the first line memory 801 of the first recording processing circuit will now be described.

The first line memory 801 of each of the C2 channels has a capacity corresponding to one line, and more specifically, has a memory matrix of 60 rows×8 columns as shown in FIG. 27. The counter 802 serves to count 480 samples in order, and the output of the counter is connected to the address input of the ROM 803. With this structure, each time the counter 802 counts a sample, a read signal is output to the ROM 803. Based on this signal, the ROM 803 sends write address data obtained in accordance with the distribution pattern, to the first line memory 801. Since the first line memory 801 is address-designated by the write address data, the memory stores an input sample, i.e., pixel data, to the corresponding address. More specifically, a pixel corresponding to a channel is stored in a corresponding memory region of the line memory 801 in the following manner.

A pixel corresponding to channel 1 is stored in one of ROW 1 to ROW 8;

A pixel corresponding to channel 2 is stored in one of ROW 9 to ROW 16;

A pixel corresponding to channel 3 is stored in one of ROW 17 to ROW 24;

A pixel corresponding to channel 4 is stored in one of ROW 25 to ROW 32;

A pixel corresponding to channel 5 is stored in one of ROW 33 to ROW 40;

A pixel corresponding to channel 6 is stored in one of ROW 41 to ROW 48;

A pixel corresponding to channel 7 is stored in one of ROW 49 to ROW 56; and A pixel corresponding to channel 8 is stored in one of ROW 57 to ROW 60.

Figures 28, 30:
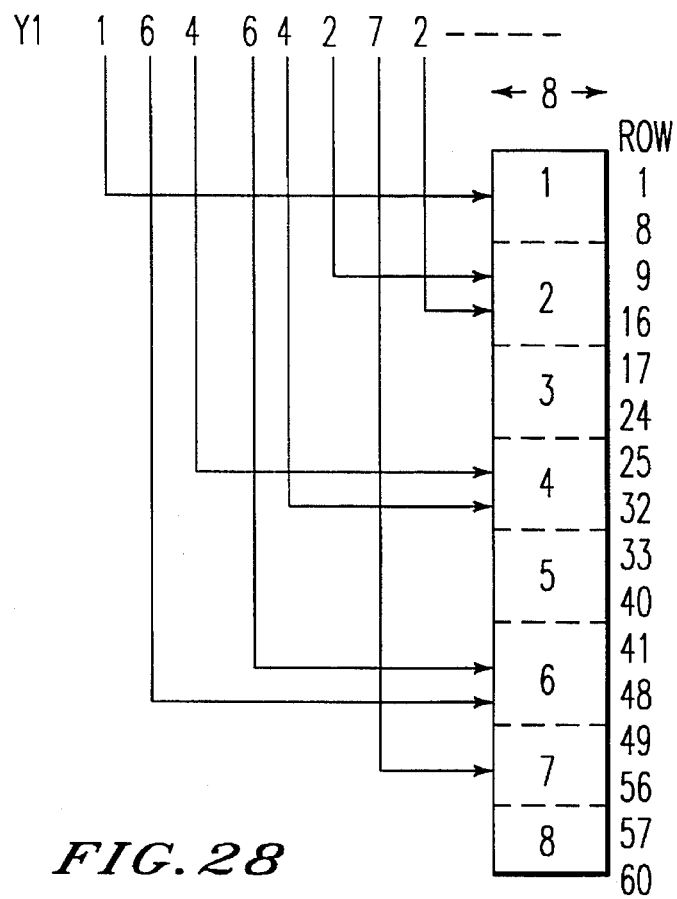
FIG. 28 is an explanatory view of a writing operation to the first line memory.
FIG. 30 is a diagram showing a method of defining a corresponding relationship between input and output of the barrel shifter shown in FIG. 25.

The writing operation will now be described with reference to the C2 channel Y1 shown in FIG. 28, taken as an example. The first pixel is stored, by address-designating the ROM 803, in one of ROW 1 to ROW 81 which corresponds to channel 1, the next pixel is stored in one of ROW 41 to ROW 48, which corresponds to channel 6, and the third pixel is stored in one of ROW 25 to ROW 32, which corresponds to channel 4. Such a writing operation is repeated until 480 pixels have been stored in each line memory 801.

Next, the operation of reading data stored as described above, from the line memory 801 will now be described.

Each time the counter 804 carries out a count operation, an address of the first line memory 801 is designated by a count output. The data items on the same column are read out from ROW 1 to ROW 60 in order, and are input to the C2 encoder 805 in order. The C2 encoder 805 adds three check symbols to 60 pixel data items. Such a process is carried out on 8 columns of pixel data.

The operation of writing data in the second line memory 807 will now be described.

The second line memory 807 of each C2 channel has a memory matrix of 63 rows×8 columns as shown in FIG. 29. An address of the second line memory 807 is designated by each of the count outputs sent from the counter 808 in order, and encode data items sent from the C2 encoder 805 are stored in ROW 1 to ROW 63 of the same column in order. The writing operation is carried out on the 8 columns.

Next, the operation of reading data from the second line memory 807, and the operation of the barrel shifter 504*i* will now be described.

The counter 809 serves to count 512 samples in order, and the count output is sent to the ROM 810, whereby the ROM 810 is address-designated by the count output, to send a readout address to the second line memory 807. Data is read out from the second line memory 807 in accordance with the address read out from the ROM 810, and sent to the barrel shifter 504*i*. The barrel shifter 504*i* sets the C2 channel to an appropriate channel which corresponds thereto. In other words, a process cycle, which consists of 8 clocks, is divided into 8 time slots, and the correspondence between input and output of the barrel shifter 504*i* can be changed based on the rule shown in FIG. 30 for each time slot. The cycle of this process is repeated 64 times for one line. For example, in the case of the C2 channel Y1, one input and one output of the ROM 810 are set to correspond to each other so that the read-out of data is carried out in the following manner.

In the time slot 1, data is read out from one of ROW 1 to ROW 8;

in the time slot 2, data is read out from one of ROW 9 to ROW 16;

in the time slot 3, data is read out from one of ROW 17 to ROW 24;

in the time slot 4, data is read out from one of ROW 25 to ROW 32;

in the time slot 5, data is read out from one of ROW 33 to ROW 40;

in the time slot 6, data is read out from one of ROW 41 to ROW 48;

in the time slot 7, data is read out from one of ROW 49 to ROW 56; and in the time slot 1, data is read out from one of ROW 57 to ROW 63.

Further, in the case of the C2 channel Y2, one input and one output of the ROM 810 are set to correspond to each other so that the read-out of data is carried out in the following manner.

In the time slot 1, data is read out from one of ROW 9 to ROW 16;

in the time slot 2, data is read out from one of ROW 17 to ROW 24;

in the time slot 3, data is read out from one of ROW 25 to ROW 32;

in the time slot 4, data is read out from one of ROW 33 to ROW 40;

in the time slot 5, data is read out from one of ROW 41 to ROW 48;

in the time slot 6, data is read out from one of ROW 49 to ROW 56;

in the time slot 7, data is read out from one of ROW 57 to ROW 63; and in the time slot 8, data is read out from one of ROW 1 to ROW 8.

The other C2 channels involve the same correspondence operation.

Consequently, for the output of the barrel shifter 504*i*, only the data of the same channel can be collected from each of the C2 channels. The output of the barrel shifter 504*i* is written in video C1 shuffling circuits 505*a* to 505*h* (field memory) shown in FIG. 6.

As in the circuit operation described above, the channel distribution rule for line 1 shown in FIG. 16 can be realized. A similar process is carried out for line 2.

Since 8 channels and 8 tracks in the track group are made to correspond to each other for one segment, the channel distribution rule shown in FIG. 16, the ratio of the data amount of the effective video signal of the video-only track, to the data amount of the effective video signal of the video/audio mixed track is set to 2 to 1, can be realized.

The second embodiment of the present invention will now be described.

Figure 19:
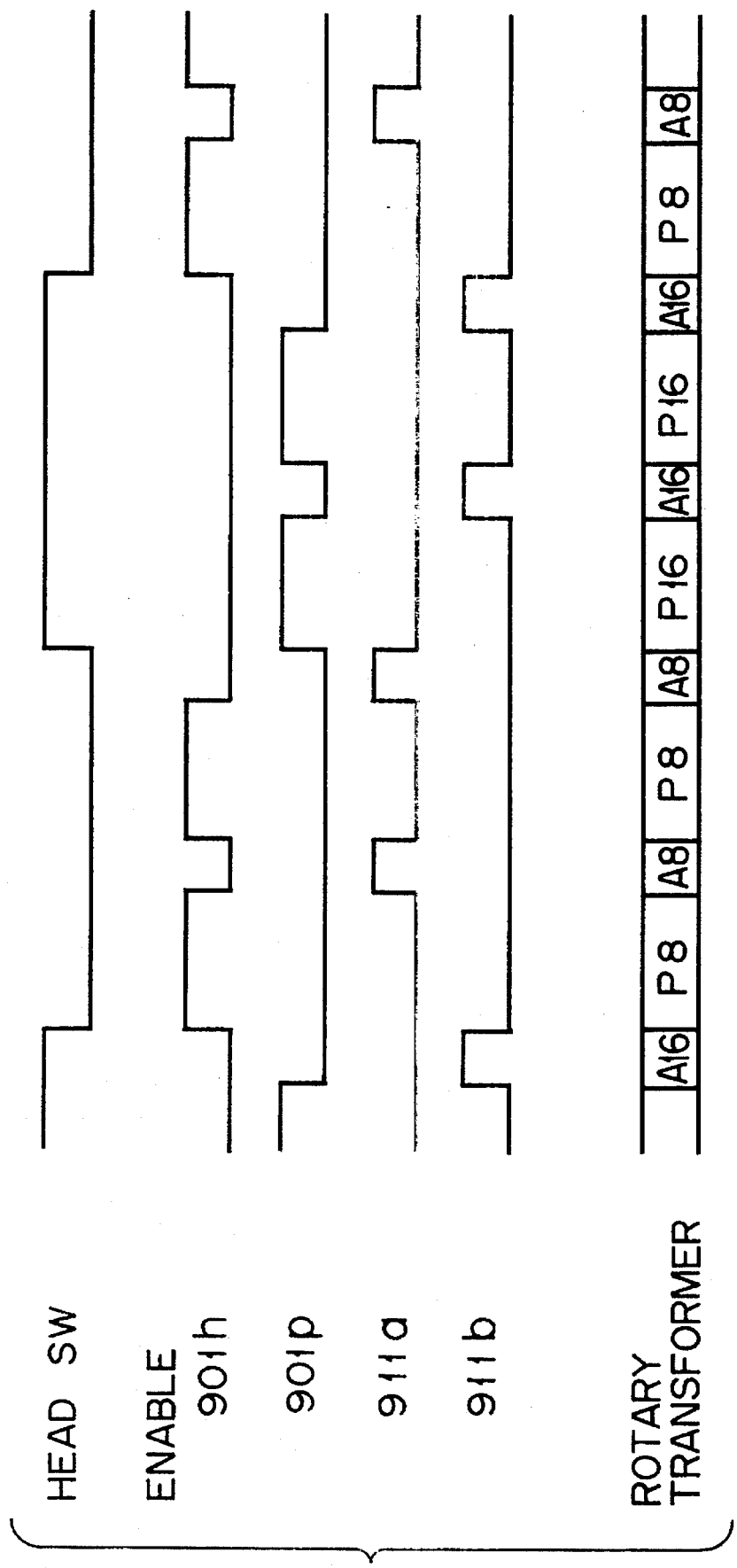
FIG. 19 presents a timing chart in advance playback mode in this embodiment.

FIG. 18 schematically illustrates the structure of the reproducing signal processing circuit in the second embodiment, using the same reference numerals for those portions corresponding or identical to what is shown in FIG. 10 to avoid their repetitive description. The outputs of the reproducing amplifiers 901*h*, 901*p*, 911*a* and 911*b* are coupled together and are enabled or disabled respectively. In preceding reproduction mode, the signals from the playback heads P8 and P16 and those from the audio advance playback heads A8 and A16 are switched in the rotary drum to be multiplexed, and the multiplexed signal is supplied to the common rotary transformer 902*h*. Enable control signals (indicating an enable state when in an H level) of the individual reproducing amplifier in the preceding reproduction mode are shown in the timing chart in FIG. 19. FIG. 19 also shows from which head a signal is supplied to the rotary transformer 902*h*. To achieve this circuit configuration, where to mount the audio advance playback heads and the normal playback heads will be restricted so that the reproducing positions of both types of playback heads can be mechanically matched with each other to permit the signals from these playback heads to be combined.

Figure 20:
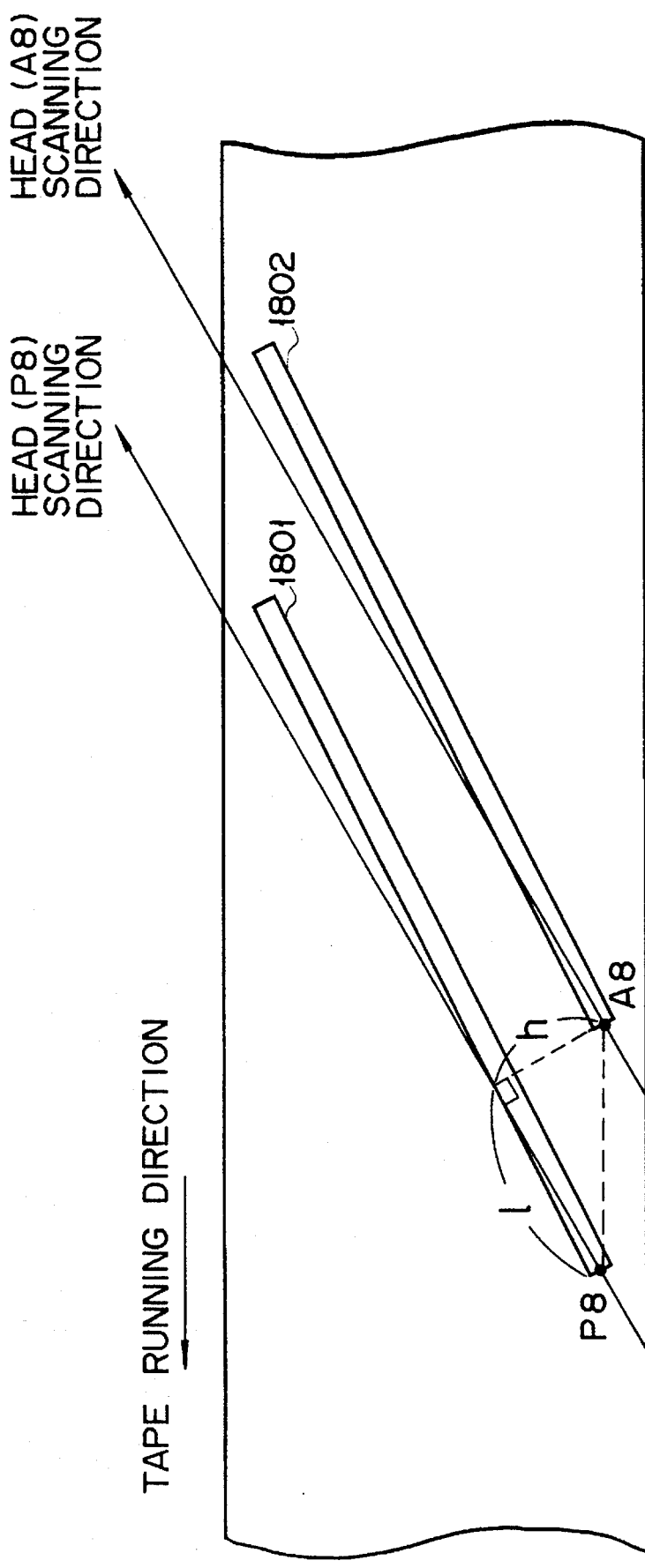
FIG. 20 is a diagram showing where audio advance playback heads are mounted.

FIG. 20 is a diagram showing where the audio advance playback heads in this embodiment are mounted. A track 1801 is a video/audio mixed track which the playback head P8 scans, and a track 1802 a video/audio mixed track preceding by a predetermined number of tracks and to be scanned by the audio advance playback head A8. When the heads P8 and A8 are disposed so as to reproduce data from the audio recording regions at the same timing, the control of switching the playback heads as shown in FIG. 19 becomes possible. To do so, the playback heads P8 and A8 should simply have the positional relationship as shown in FIG. 20 (separated by a distance l in the scanning direction of the rotary drum and a distance h in the height direction). The same will be applied to heads P16 and A16. More specifically, the audio advance playback heads A8 and A16 are disposed in such a way that the period in which the playback heads P8 and P16 reproduce data from the audio recording regions on given video/audio mixed tracks coincides with the period in which the audio advance playback heads A8 and A16 reproduce data from the audio recording regions on video/audio mixed tracks preceding by predetermined times from the former video/audio mixed tracks.

The second embodiment eliminates the need for the rotary transformer 912 and the reproducing circuit 913 as required in the first embodiment, thus allowing for reduction of the number of channels of the rotary transformers and some reproducing circuits by one channel.

The third embodiment will now be described.

There are presently some candidates other than what has been discussed above for HDTV systems. The European proposal is one of them, and its specifications are a field frequency of 50 Hz, and 1152 effective lines per frame (576 lines per field). There are 1920 or 2048 effective samples of a Y signal per line. It is not at present clear whether only one of those candidates will be determined as an international standard; it is probable that the standards of a plurality of HDTV systems will coexist. Even in this case, giving as many common properties as possible to the recording format of digital VTRs would be a significant merit in operation and maintenance of VTR decks as well as their development and production.

According to the first embodiment, a video signal is processed with one segment (corresponding to ⅕ field) as a unit, and because of the field frequency being 60 Hz, the segment frequency is 300 Hz. In the European proposal, when a video signal is processed in the units of segments, with six segments per field (i.e., 96 lines per segment), because of the field frequency being 50 Hz, the segment frequency also becomes 300 Hz, thus ensuring complete common standardization of the deck portion including the diameter of the rotary drum, the number of its rotations, the number of heads and the tape feeding speed. With employment of the same structure for the sync blocks, the amount of the commonly-standardizable portion would increase.

Further, since there are many types of languages in use in Europe, voices in several languages are probably required for a single video signal. In consideration of audio data suitable for an HDTV system, at least two channels are needed for each language in order to cope with the stereo system. Particularly in Europe, therefore, there is a very strong demand for multi-channel audio systems. The HDTV system of the European proposal deals with a less total amount of effective information of video data than that of the first embodiment. Using the empty region corresponding to this difference, therefore, the number of channels can be increased without raising the total recording rate.

Figure 21:
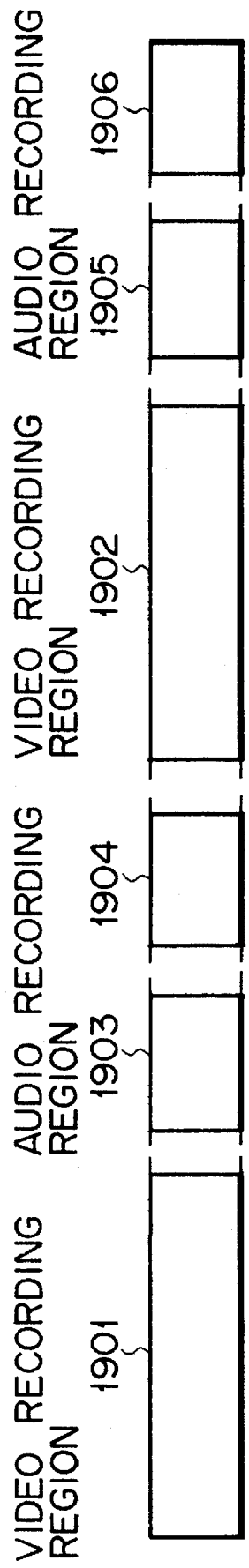
FIG. 21 is a diagram showing the contents of a video/audio mixed track according to a third embodiment of the present invention.

FIG. 21 illustrates the contents of a video/audio mixed track according to the third embodiment. Regions 1901 and 1902 are video recording regions, while regions 1903 to 1906 are audio recording regions. While two audio recording regions are provided in the first embodiment, there are four audio recording regions in the third embodiment, ensuring recording of an 8-channel digital audio signal. The video recording regions on a video/audio mixed track are made smaller by the increase in the audio recording regions. Even with the increased number of audio channels as in the third embodiment, the number of the audio advance playback heads and the number of channels of the rotary transformer will not particularly increase.

The present invention is not limited to the above-described embodiments, but may be modified in various other manners. For instance, although one out of eight tracks is used as a video/audio mixed track in those embodiments, K tracks out of N tracks (K is greater than 1 and N is other than 8) may be used as video/audio mixed tracks. The present invention is also applicable to the case where parameters of the HDTV system, such as the number of samples, are altered, or digital VTRs according to the present standard television system different from the HDTV system. Furthermore, the present invention can be applied to VTRs in which not only the video recording regions and audio recording regions but also other added data recording regions are provided on all of or some of the tracks.

The present invention can provide a rotary head type magnetic recording/playback apparatus suitable for cassette type digital VTR for an HDTV system, which apparatus permits the electromagnetic transformation section and some signal processors for audio signals to be also used for video signals, reducing the hardware scale, prevents audio data from being easily affected by a burst error, and minimizes the increase in the number of advance playback heads and the number of channels of the rotary transformer.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rotary head type magnetic recording/playback apparatus for recording a video signal and an audio signal on a plurality of inclined tracks formed on a magnetic tape with respect to a lengthwise direction thereof and for reproducing said video signal and audio signal therefrom, comprising:

input means for receiving a video signal and an audio signal;

recording means for treating said inclined tracks as a plurality of track groups each including at least one first inclined track and a plurality of second inclined tracks, said recording means recording only a video signal on said second inclined tracks in each of said track groups, said second inclined tracks being used as video-only tracks, and recording a video signal and an audio signal in a mixed manner on said first inclined track used as a video/audio mixed track;

reproducing means for reproducing said video signal and audio signal from said inclined tracks in each of said track groups; and distributing means for designating the track numbers of the tracks of each of said track groups, in accordance with a predetermined distribution pattern in order to distribute the video signal to the first and second tracks corresponding to the designated track numbers, the distribution pattern being determined in accordance with an integer ratio of the amount of data of an effective video signal per video-only track to the amount of data of an effective video signal per video/audio mixed track, the integer ratio being A:B and determined such that the number S of recorded video samples per line is divisible by A (N-K)+BK, where A (N-K)+BK is designated by the variable P and K video/audio mixed tracks are provided per N tracks, the effective video signals being video signals actually recorded on said video-only track and said video/audio mixed track.

2. A magnetic recording/playback apparatus according to claim 1, wherein said apparatus further comprises a rotary drum around which said magnetic tape is wound at a wrap angle of approximately 180 degrees;

said recording means includes a plurality of first recording heads equal in number to the sum of said first inclined track and said second inclined tracks, and which are mounted on said rotary drum, a plurality of second recording heads disposed respectively opposite to said first recording heads, and means for alternately switching said first recording heads and said second recording heads to record a video signal and an audio signal alternately on adjoining track groups; and said reproducing means includes a plurality of first playback heads equal in number to said first recording heads, and which are mounted on said rotary drum, a plurality of second playback heads disposed respectively opposite to said first playback heads, and means for alternately switching said first playback heads and said second playback heads to reproduce a video signal and an audio signal alternately from adjoining track groups.

3. A magnetic recording/playback apparatus according to claim 1, wherein said recording means has video/audio signal recording heads for recording a video signal and an audio signal alternately on said video/audio mixed tracks.

4. A magnetic recording/playback apparatus according to claim 3, wherein said recording means has video/audio signal recording heads for recording audio signals at center and rear portions of each of a plurality of video/audio mixed tracks so that the video signals can be recorded between the center and rear portions of the video/audio mixed tracks.

5. A magnetic recording/playback apparatus according to claim 1, wherein said recording means has means for inserting error correction data used for correcting error data less than at least one first tracks in said audio signal, to acquire an error-correction coded audio signal, and means for dividing and recording said error-correction coded audio signal on at least two video/audio mixed tracks.

6. A magnetic recording/playback apparatus according to claim 1, wherein said reproducing means has playback heads for reproducing audio signals from said first video/audio mixed track, at least one audio advance playback head disposed so as to reproduce at least one audio signal recorded on another video/audio mixed track preceding said first video/audio mixed track during reproduction by said playback head, switching means for switching between the audio signal reproduced by said playback head and the preceding audio signal reproduced by said audio advance playback head, and a rotary transformer for receiving a signal output from said switching means.

7. A magnetic recording/playback apparatus according to claim 6, wherein said audio advance playback heads are disposed on said rotary drum in such a way that a period in which said playback heads reproduce audio signals from audio recording regions on said first video/audio mixed track coincides with a period in which said audio advance playback heads reproduce audio signals from audio recording regions on a video/audio mixed track preceding said first video/audio mixed track by a predetermined time period.

8. A rotary head type magnetic recording/playback apparatus according to claim 1, wherein when the variables N, K and S are set at 8, 1 and 960, respectively, the values A, B and P are determined as follows:

| A | B | P |
|---|---|---|
| 2 | 1 | 15 |
| 4 | 2 | 30 |
| 8 | 4 | 60 |
| 9 | 1 | 64 |
| 11 | 3 | 80 |
| 13 | 5 | 96 |
| 16 | 8 | 120 |
| 17 | 1 | 120 |
| 21 | 13 | 160 |
| 22 | 6 | 160 |
| 25 | 17 | 192 |
| 26 | 10 | 192 |
| 27 | 3 | 192 |
| 31 | 23 | 240 |
| 32 | 16 | 240 |
| 33 | 9 | 240 |
| 34 | 2 | 240 |
| 41 | 33 | 320 |
| 42 | 26 | 320 |
| 43 | 19 | 320 |
| 44 | 12 | 320 |
| 45 | 5 | 320 |
| 61 | 53 | 480 |
| 62 | 46 | 480 |
| 63 | 39 | 480 |
| 64 | 32 | 480 |
| 65 | 25 | 480 |
| 66 | 18 | 480 |
| 67 | 11 | 480 |
| 68 | 4 | 480 |
| 121 | 113 | 960 |
| 122 | 106 | 960 |
| 123 | 99 | 960 |
| 124 | 92 | 960 |
| 125 | 85 | 960 |
| 126 | 78 | 960 |
| 127 | 71 | 960 |
| 128 | 64 | 960 |
| 129 | 57 | 960 |
| 130 | 50 | 960 |
| 131 | 43 | 960 |
| 132 | 36 | 960 |
| 133 | 29 | 960 |
| 134 | 22 | 960 |
| 135 | 15 | 960 |
| 136 | 8 | 960 |
| 137 | 1 | 960. |

9. A rotary head type magnetic recording/playback apparatus according to claim 1, wherein when the variables N, K and S are set at 2, 1 and 768, respectively, the values A, B and P are determined as follows:

| A | B | P |
|---|---|---|
| 2 | 1 | 3 |

-continued

| A | B | P |
| --- | --- | --- |
| 3 | 1 | 4 |
| 4 | 2 | 6 |
| 5 | 1 | 6 |
| 5 | 3 | 8 |
| 6 | 2 | 8 |
| 7 | 1 | 8 |
| 7 | 5 | 12 |
| 8 | 4 | 12 |
| 9 | 3 | 12 |
| 9 | 7 | 16 |
| 10 | 2 | 12 |
| 10 | 6 | 16 |
| 11 | 1 | 12 |
| 11 | 5 | 16 |
| 12 | 4 | 16 |
| 13 | 3 | 16 |
| 13 | 11 | 24 |
| 14 | 2 | 16 |
| 14 | 10 | 24 |
| 15 | 1 | 16 |
| 15 | 9 | 24 |
| 16 | 8 | 24 |
| 17 | 7 | 24 |
| 17 | 15 | 32 |
| 18 | 6 | 24 |
| 18 | 14 | 32 |
| 19 | 5 | 24 |
| 19 | 13 | 32 |
| 20 | 4 | 24 |
| 20 | 12 | 32. |

10. A rotary head type magnetic recording/playback apparatus according to claim 1, wherein when the variables N, K and S are set at 4, 1 and 360, respectively, the values A, B and P are determined as follows:

| A | B | P |
| --- | --- | --- |
| 3 | 1 | 10 |
| 4 | 3 | 15 |
| 5 | 3 | 18 |
| 6 | 2 | 20 |
| 7 | 3 | 24 |
| 8 | 6 | 30 |
| 9 | 3 | 30 |
| 10 | 6 | 36 |
| 11 | 3 | 36 |
| 11 | 7 | 40 |
| 12 | 4 | 40 |
| 12 | 9 | 45 |
| 13 | 1 | 40 |
| 13 | 6 | 45 |
| 14 | 3 | 45 |
| 16 | 12 | 60 |
| 17 | 9 | 60 |
| 18 | 6 | 60 |
| 19 | 3 | 60 |
| 19 | 15 | 72 |
| 20 | 12 | 72. |

11. A rotary head type magnetic recording/playback apparatus for recording a video signal and an audio signal on a plurality of inclined tracks formed on a magnetic tape with respect to a lengthwise direction thereof and for reproducing said video signal and audio signal therefrom, comprising:

input means for receiving a video signal and an audio signal;

recording means for treating said inclined tracks as a plurality of track groups each including at least one first inclined track and a plurality of second inclined tracks, said recording means recording only a video signal on said second inclined tracks in each of said track groups, said second inclined tracks being used as video-only tracks, and recording a video signal and an audio signal in a mixed manner on said first inclined track used as a video/audio mixed track;

reproducing means for reproducing said video signal and audio signal from said inclined tracks in each of said track groups; and distributing means for designating the track numbers of the tracks of each of said track groups, in accordance with a predetermined distribution pattern in order to distribute the video signal to the first and second tracks corresponding to the designated track numbers, the distribution pattern being determined in accordance with an integer ratio of the amount of data of an effective video signal per video-only track to the amount of data of an effective video signal per video/audio mixed track, the integer ratio being 2:1 and determined such that a 15-integer number of recorded video samples per line is divisible by 15, where one video/audio mixed track is provided per 8 tracks, effective video signals being video signals actually recorded on said video/only track and said video-audio mixed track.

\* \* \* \* \*